(12) United States Patent
Takahashi et al.

(10) Patent No.: US 11,647,170 B2
(45) Date of Patent: May 9, 2023

(54) IMAGE PROJECTION DEVICE

(71) Applicants: Tomoko Takahashi, Kanagawa (JP); Yuuji Wada, Kanagawa (JP); Yu Yoneda, Kanagawa (JP); Daisuke Tomita, Kanagawa (JP); Kunihiko Nishioka, Kanagawa (JP); Hideki Kosugi, Kanagawa (JP); Yasukazu Kitamura, Kanagawa (JP); Toshihiro Hamamura, Tokyo (JP); Takaya Muraishi, Kanagawa (JP); Naomi Sugimoto, Kanagawa (JP); Yasunari Harada, Kanagawa (JP)

(72) Inventors: Tomoko Takahashi, Kanagawa (JP); Yuuji Wada, Kanagawa (JP); Yu Yoneda, Kanagawa (JP); Daisuke Tomita, Kanagawa (JP); Kunihiko Nishioka, Kanagawa (JP); Hideki Kosugi, Kanagawa (JP); Yasukazu Kitamura, Kanagawa (JP); Toshihiro Hamamura, Tokyo (JP); Takaya Muraishi, Kanagawa (JP); Naomi Sugimoto, Kanagawa (JP); Yasunari Harada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/076,132

(22) Filed: Oct. 21, 2020

(65) Prior Publication Data
US 2021/0127097 A1    Apr. 29, 2021

(30) Foreign Application Priority Data

Oct. 23, 2019 (JP) .............................. JP2019-192681
Dec. 27, 2019 (JP) .............................. JP2019-238331
(Continued)

(51) Int. Cl.
    *H04N 9/31* (2006.01)
(52) U.S. Cl.
    CPC ......... *H04N 9/3155* (2013.01); *H04N 9/3164* (2013.01); *H04N 9/3173* (2013.01)
(58) Field of Classification Search
    CPC .. H04N 9/3155; H04N 9/3164; H04N 9/3173; G03B 21/145; G03B 21/14
    (Continued)

(56) References Cited

U.S. PATENT DOCUMENTS 5,237,162 A * 8/1993 Harden ............... G06K 7/10881
                                                     235/455
6,066,857 A * 5/2000 Fantone ............. G06K 7/10811
                                                     250/566
(Continued)

FOREIGN PATENT DOCUMENTS

EP       2247113      11/2010
EP       2590019       5/2013
(Continued)

OTHER PUBLICATIONS

Extended European Search Report for 20203306.4 dated Mar. 17, 2021.

*Primary Examiner* — Michael Lee
(74) *Attorney, Agent, or Firm* — IPUSA, PLLC

(57) ABSTRACT

An image projection device includes a projector configured to project an image; and an operation unit configured to receive an operation performed by an operator. The projector is in a projecting state while the operation unit is receiving a pressing operation performed by the operator, and the projector is in a non-projecting state while the operation unit is not receiving a pressing operation performed by the operator.

16 Claims, 35 Drawing Sheets

(30) Foreign Application Priority Data

| Dec. 27, 2019 | (JP) | JP2019-238332 |
| Jul. 27, 2020 | (JP) | JP2020-126881 |
| Jul. 27, 2020 | (JP) | JP2020-126882 |

(58) Field of Classification Search
USPC .......................................................... 348/789
See application file for complete search history.

(56) References Cited

U.S. PATENT DOCUMENTS

| 8,812,053 | B2 | 8/2014 | Osaka | |
| 2007/0099700 | A1* | 5/2007 | Solomon | G07F 17/3211 |
| | | | | 463/34 |
| 2010/0026818 | A1 | 2/2010 | Yang et al. | |
| 2010/0091247 | A1* | 4/2010 | Yamamoto | G03B 21/28 |
| | | | | 353/20 |
| 2011/0149254 | A1* | 6/2011 | Kotani | H04N 9/3173 |
| | | | | 353/122 |
| 2011/0300904 | A1* | 12/2011 | Osaka | G03B 21/005 |
| | | | | 455/556.1 |
| 2012/0044467 | A1* | 2/2012 | Nakayama | G03B 21/20 |
| | | | | 353/85 |
| 2013/0050657 | A1* | 2/2013 | Morohoshi | G03B 21/145 |
| | | | | 353/52 |
| 2013/0176497 | A1* | 7/2013 | Kawai | H04N 21/4622 |
| | | | | 348/705 |
| 2016/0081168 | A1* | 3/2016 | Kawamura | G03B 21/2053 |
| | | | | 315/291 |
| 2019/0247162 | A1* | 8/2019 | Lin | A61B 1/00172 |

FOREIGN PATENT DOCUMENTS

| JP | H06-118372 | | 4/1994 | |
| JP | 10112891 | A * | 4/1998 | G08C 17/00 |
| JP | 2005-292563 | | 10/2005 | |
| JP | 2007-096542 | | 4/2007 | |
| JP | 2008046216 | A * | 2/2008 | H04N 9/3141 |
| JP | 2008139453 | A * | 6/2008 | |
| JP | 2009-175174 | | 8/2009 | |
| JP | 2012047850 | A * | 3/2012 | H04N 5/74 |
| JP | 2015-026082 | | 2/2015 | |
| KR | 10-1587085 | | 1/2016 | |

* cited by examiner

IMAGE PROJECTION DEVICE

CROSS-REFERENCE TO RELATED APPLICATIONS

The present application claims priority under 35 U.S.C. § 119 to Japanese Patent Application No. 2019-192681 filed on Oct. 23, 2019; Japanese Patent Application No. 2019-238331 filed on Dec. 27, 2019; Japanese Patent Application No. 2019-238332 filed on Dec. 27, 2019; Japanese Patent Application No. 2020-126881 filed on Jul. 27, 2020; and Japanese Patent Application No. 2020-126882 filed on Jul. 27, 2020, the entire contents of which are hereby incorporated by reference.

BACKGROUND OF THE INVENTION

1. Field of the Invention

The present disclosure relates to image projection devices.

2. Description of the Related Art

Conventionally, an image projection device having a configuration that turns off the light source appropriately during operation of the device for power saving, extension of the life of the lamp, and reduction of heat generation, has been known. Also, in recent years, there has been demand for image projection devices of the so-called handy-type, which is hand-held by the operator when projecting images. As use cases where such devices are effective, product explanation of and image projection.

For example, Japanese Laid-Open Patent Application No. H6-118372 (Patent document 1) discloses a configuration in which the presence or absence of an image to be projected is determined based on the presence or absence of a video signal forming the image, and the lamp is turned off when there is no image to be projected because it is not necessary to be turned on. Also, when such a hand-type image projection device is tilted during projection, the projection image is also tilted. Japanese Laid-Open Patent Application No. 2009-175174 (Patent document 2) discloses a configuration in which image correction is performed by detecting the tilt of the housing, as it is difficult to precisely hold the device horizontally when projection is performed with holding an image projection device in hand.

SUMMARY OF THE INVENTION

According to one aspect of the present disclosure, an image projection device includes a projector configured to project an image; and an operation unit configured to receive an operation performed by an operator. The projector is in a projecting state while the operation unit is receiving a pressing operation performed by the operator, and the projector is in a non-projecting state while the operation unit is not receiving a pressing operation performed by the operator.

DETAILED DESCRIPTION OF THE EMBODIMENTS

Figure 1:
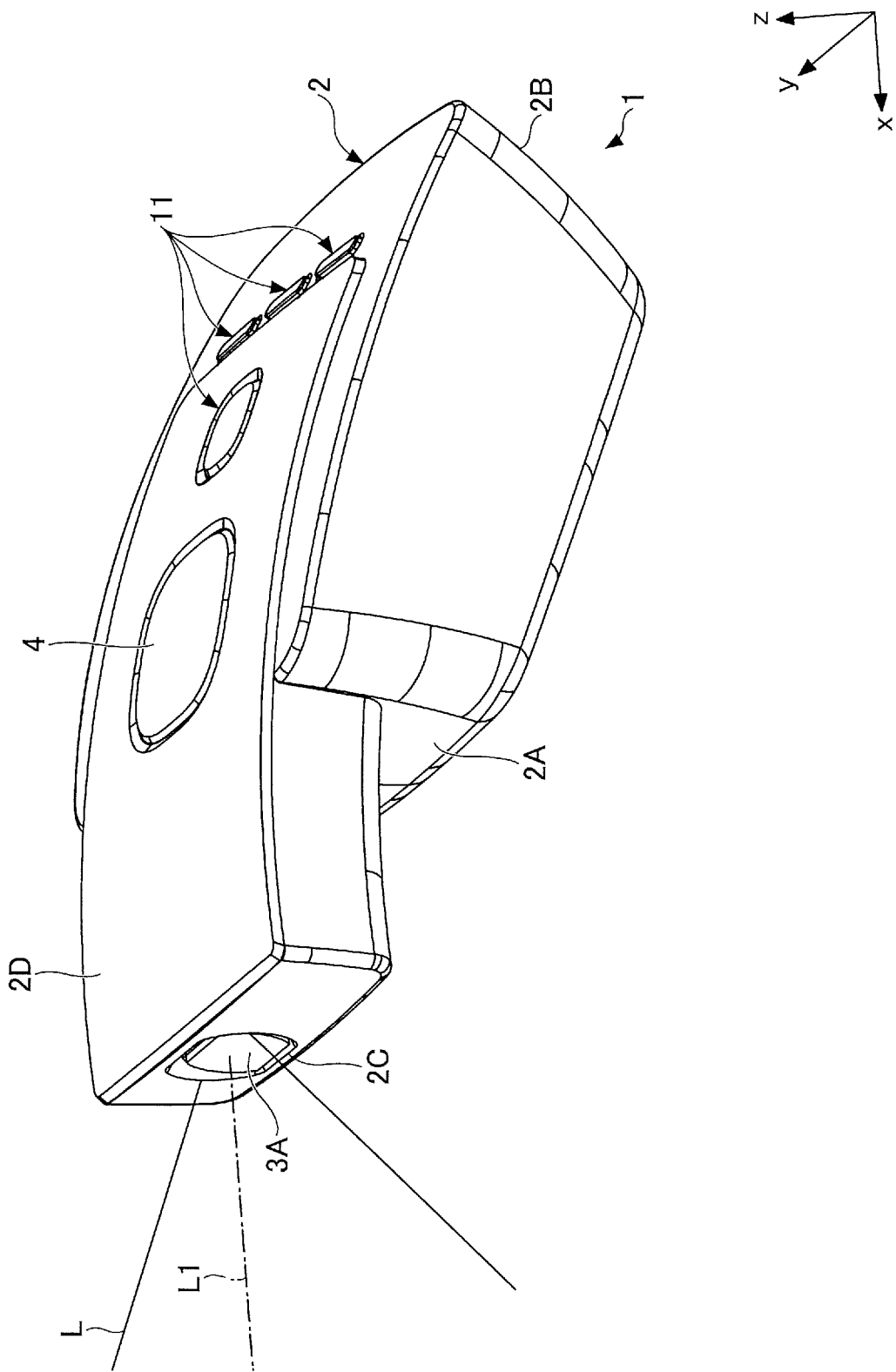
FIG. 1 is a perspective view of an image projection device according to a first embodiment viewed from the z-positive direction side.

In the following, embodiments will be described with reference to the accompanying drawings. In order to facilitate understanding of the description, the same components throughout the drawings are designated by the same reference numerals as far as possible, to omit duplicate descriptions.

Note that in the following description, the x, y, and z directions are perpendicular to each other. The x direction is the projection direction of an image projection device 1. The y direction is the left-and-right direction of the projection image of the image projection device 1, which is typically the horizontal direction. The z direction is the up-and-down direction of the projection image of the image projection device 1, which is typically the vertical direction.

First Embodiment

Figure 2:
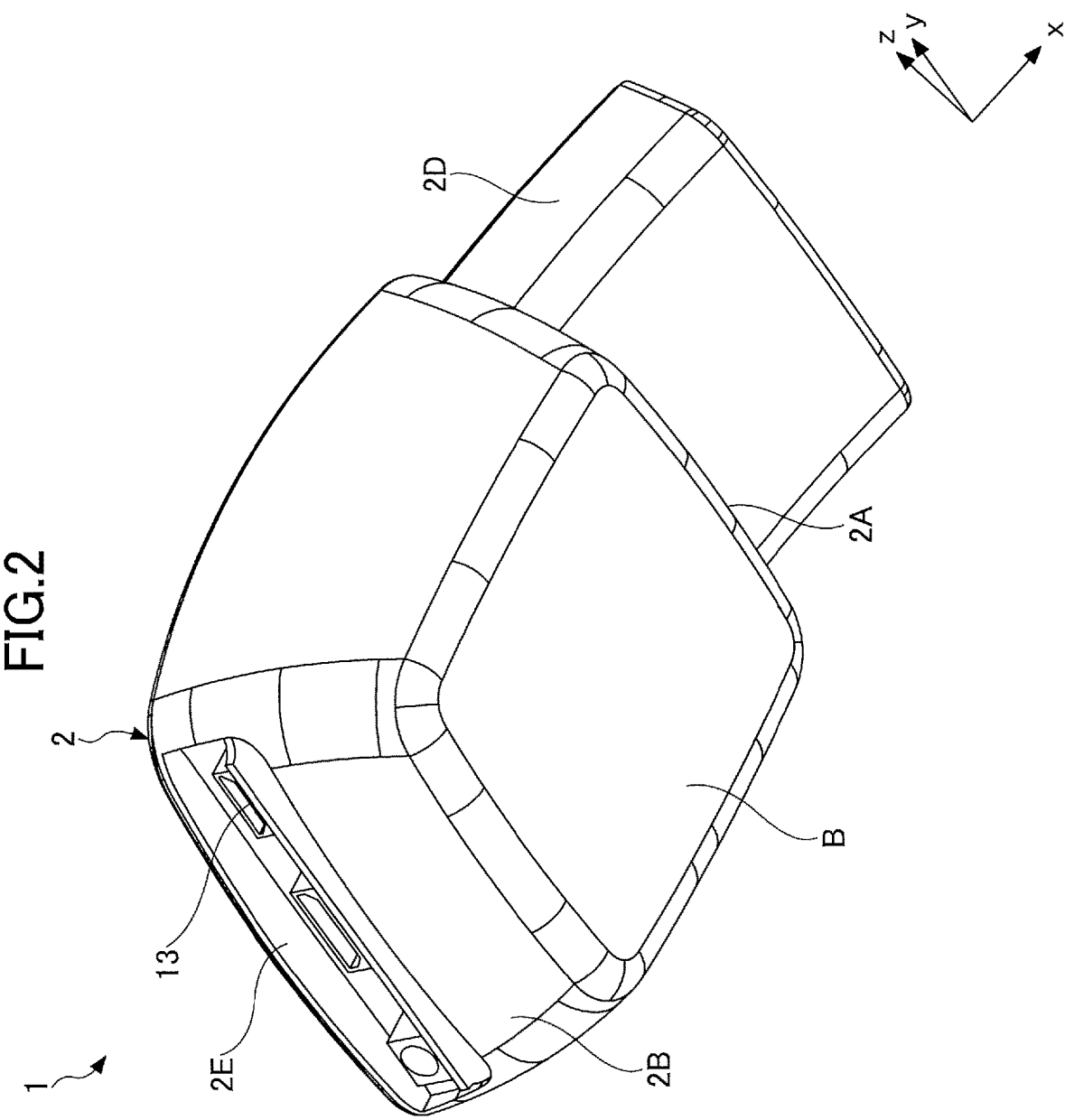
FIG. 2 is a perspective view of an image projection device according to the first embodiment viewed from the z-negative direction side.
Figure 3:
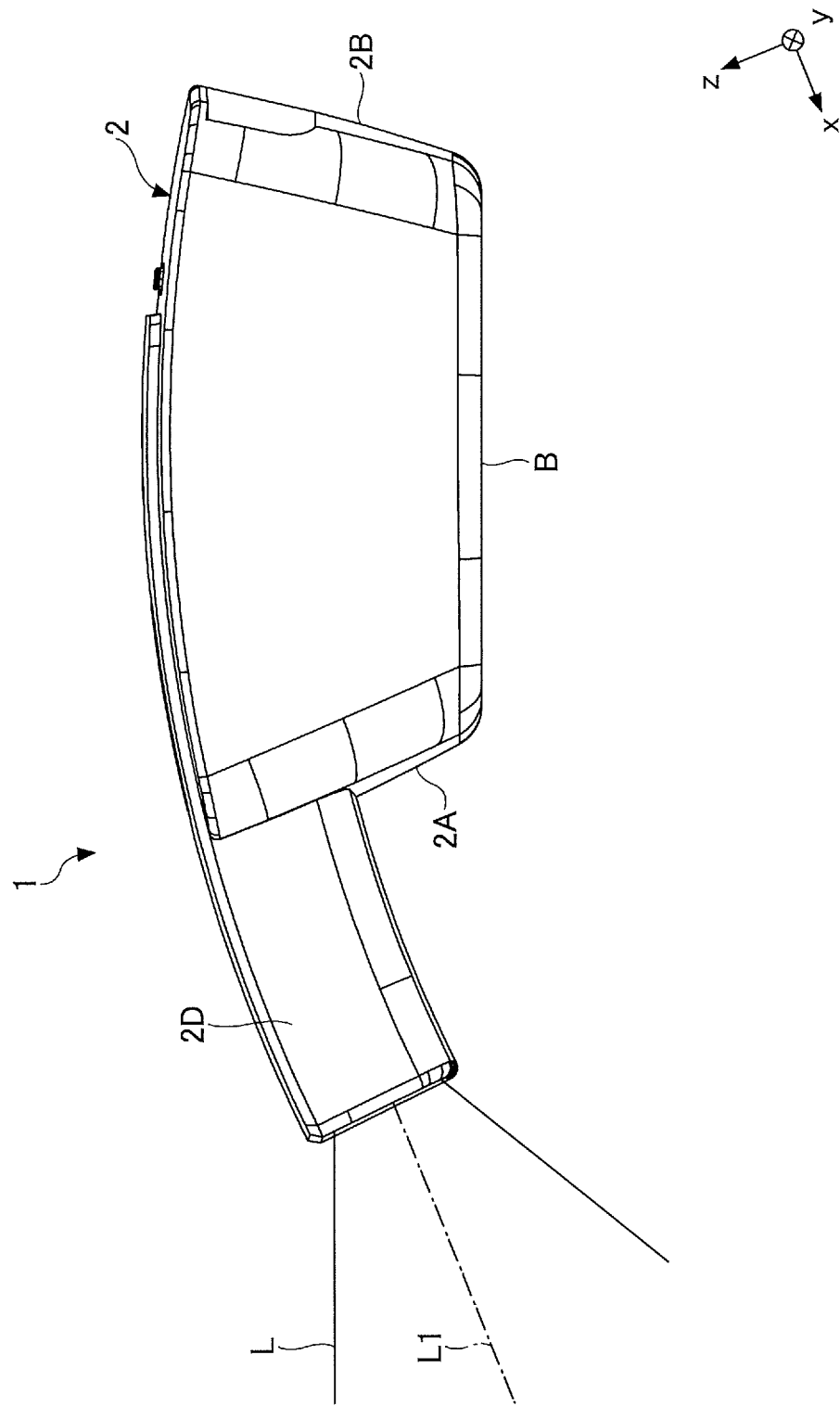
FIG. 3 is a side view of the image projection device according to the first embodiment viewed from the y-negative direction side.
Figure 4:
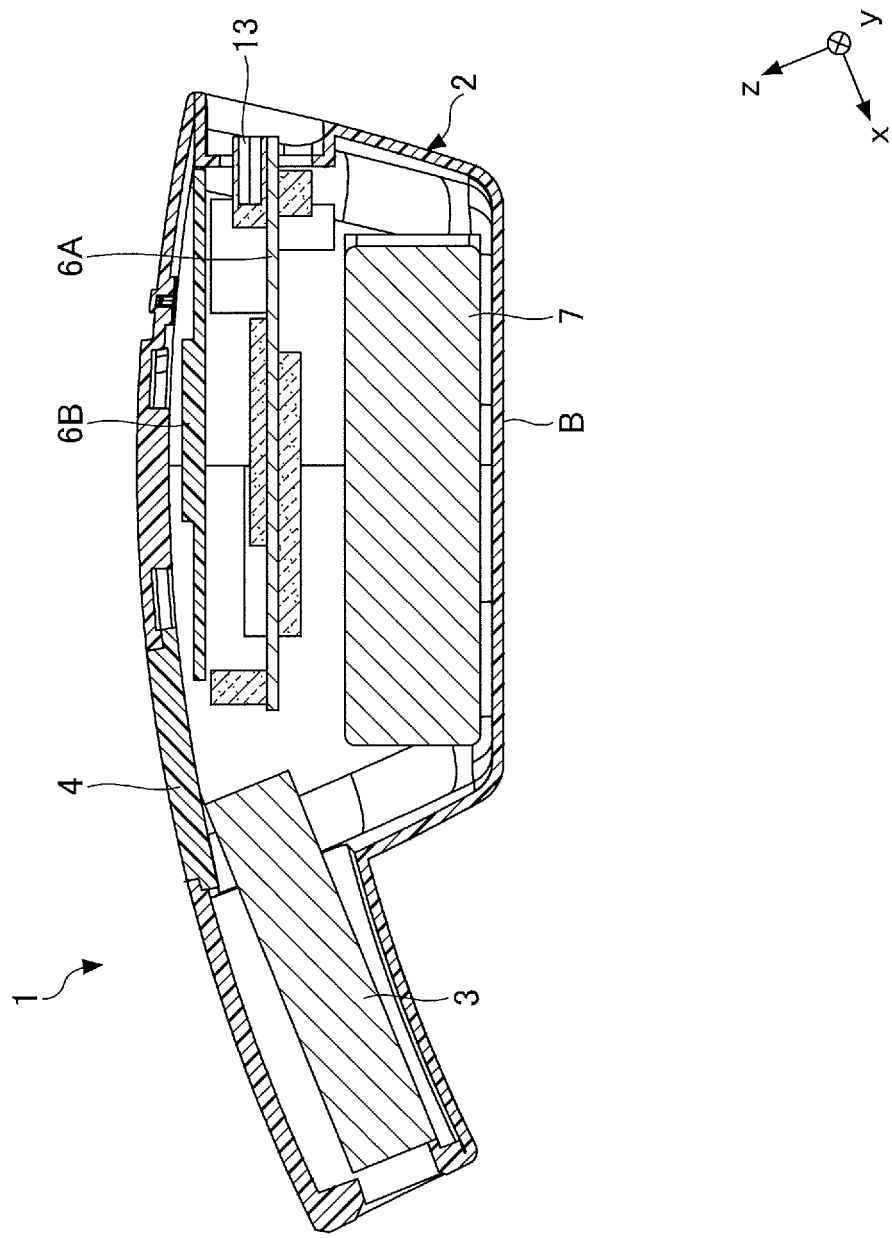
FIG. 4 is a side cross-sectional view of the image projection device illustrated in FIG. 1.

With reference to FIGS. 1 to 15, a first embodiment will be described. FIG. 1 is a perspective view of an image projection device 1 according to the first embodiment viewed from the z-positive direction side. FIG. 2 is a perspective view of an image projection device according to the first embodiment viewed from the z-negative direction side. FIG. 3 is a side view of the image projection device according to the first embodiment viewed from the y-negative direction side. FIG. 4 is a side cross-sectional view of the image projection device 1 illustrated in FIG. 1, which is a longitudinal cross-sectional view of the image projection device 1 along the longitudinal direction.

The image projection device 1 illustrated in FIGS. 1 to 4 is a so-called handy-type image projection device, which can be held by the operator with one hand when projecting images.

The image projection device 1 includes a main body 2, a projector 3, and a switch 4 (an operation unit). The main body 2 is formed in a shape that can be held by one hand. The projector 3 projects an image by emitting light to the outside. This light will be referred to as projection light, and this image will be referred to as a projection image. The switch 4 switches the projector 3 between the projecting state and the non-projecting state in response to an operation input. The main body 2 is hollow to house the projector 3 and the other components in the interior of the main body 2.

The switch 4 is arranged on the surface of the main body 2. Note that the switch 4 is an element for the user to input an operation such as pressing by physically touching a finger or the like on it, and the switch 4 may also be referred to as the "operation unit 4" in the following description. In other words, the switch 4 receives an operation performed by the operator. Also, the switch 4 is coupled with a switching unit 18 (see FIG. 5, etc.) provided on an electric circuit. The switching unit 18 operating in response to a user operation input on the switch 4 switches a wire 14 (see FIG. 5) between a conducting state and a non-conducting state on the electric circuit, and thereby, switches the projector 3 between the projecting state and the non-projecting state. The operation unit 4 and the switching unit 18 may be configured to be integrally formed as a single switching component, or may be configured to be arranged separately and connected electrically.

Note that user operations input into the operation unit 4 include, for example, a pressing operation. The pressing operation includes an operation pressing a button, a pressing and sliding operation, a touching operation on a touch panel, and the like, and also includes an operation of recognizing that the operator has pressed the operation unit 4.

It is possible for the operator to emit light L from the projector 3 at a desired timing by performing an operation on the switch 4, and it is also possible to stop emitting the light L.

The projector 3 is installed in a convex part 2D on the front side in the x-positive direction of the main body 2 such that the projection direction extends along the longitudinal direction (x direction) of the main body 2. The convex part 2D is formed to protrude on the x-positive direction side, namely, from an end 2A of the main body 2 on the x-positive direction side toward the side where the projector 3 projects a screen. The convex part 2D is formed to be integrated with the main body 2, and the internal space is communicated. Also, the projector 3 includes a lens part 3A, and the lens part 3A is installed to be exposed from an opening 2C provided at the front end of the convex part 2D in the x-positive direction, and the projector 3 is installed in the main body 2 such that the up-and-down direction of an image projected from the lens part 3A extends along the z direction, and the left-and-right direction of the image extends along the y direction. Also, the projector 3 includes a focus adjustment dial, which may be exposed externally through an opening provided in part of the convex part 2D. In this case, the operator can adjust the focus of a projection image by operating the focus adjustment dial.

Next, with reference to FIG. 4, the internal structure of the image projection device 1 will be described.

As illustrated in FIG. 4, the image projection device 1 includes the projector 3 described above that is housed in the interior of the convex part 2D; and a control board 6A (controller), a control board 6B (communication unit), and a battery 7 (power supply) housed in the interior of the main body 2.

The control board 6A controls operations of the projector 3. The control board 6A can be physically configured as a computer system in which a CPU, a RAM, a ROM, a storage device, interfaces, and the like are connected via a bus. Various functions of the control board 6A are implemented by loading predetermined computer software on the hardware such as the CPU and the RAM; performing reading and writing data on the RAM and the storage device under control of the CPU; and operating the other components such as the projector 3 and external devices through the interfaces. The control board 6B performs wireless communication such as Wi-Fi(registered trademark), to connect with an external device.

The battery 7 is a power supply to supply power to the projector 3 and the control boards 6A and 6B, which is a plate-shaped secondary battery.

As illustrated in FIGS. 1 and 2, a group of buttons 11 is provided on the surface on the z-positive direction side of the main body 2. The group of buttons 11 includes multiple buttons for operating various functions of the projection device such as a main power supply. In an opening 2E on the x-negative direction side of the main body 2, connectors 13 such as a USB connector and an HDMI (registered trademark) connector are arranged to be exposed, and configured to be connectable by wire with various external devices. The connectors 13 are installed, for example, on the control board 6A.

Figure 5:
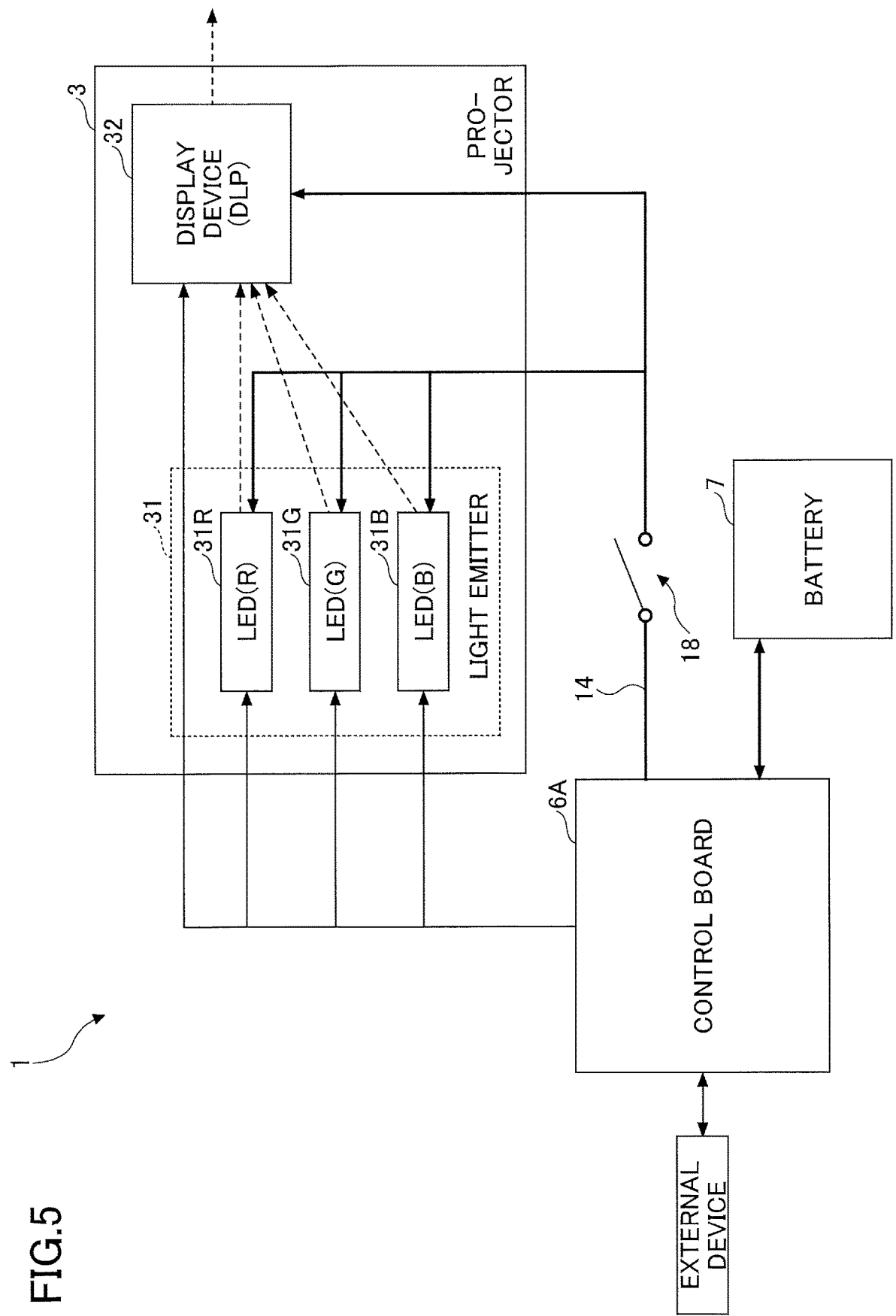
FIG. 5 is a block diagram of the image projection device.

FIG. 5 is a block diagram of the image projection device 1. As illustrated in FIG. 5, the projector 3 includes an emitter 31 and a display device 32. The emitter 31 includes LEDs 31R, 31G, and 31B. The LEDs 31R, 31G, and 31B are light sources of red color (R), green color (G), and blue color (B), respectively. The display device 32 is an image forming unit that forms a projection image through light output from the emitter 31 and outputs the image to the outside. In the present embodiment, a DLP (Digital Light Processing) device is used as the display device 32. In the following description, the "display device 32" may also be denoted to as the "DLP 32". Note that the emitter 31 and the DLP 32 may be replaced with other elements capable of performing the respective functions. In other words, although an LED is used as the emitter 31, a halogen lamp or the like may be used. Also, although a DLP device is used as the display device, a liquid crystal display device may be used.

In FIG. 5, the information transmission system of the image projection device 1 is designated with solid lines, the power supply system is designated with thick solid lines, and the optical system is designated with by dotted lines. As illustrated in FIG. 5, the information transmission system of the image projection device 1 outputs control signals from the control board 6A to the emitter 31 and the display device 32 (DLP) of the projector 3. Also, the power supply system of the image projection device 1 first supplies the power to the control board 6A from the battery 7, and further supplies the power from the control board 6A through the wire 14 to the emitter 31 and the DLP 32 of the projector 3. In addition, particularly in the present embodiment, the switching unit 18 is arranged on the wire 14 connecting the control board 6A with the projector 3. The switching unit 18 can be switched between an on state and an off state by an operation input on the switch 4 as the operation unit. FIG. 5 illustrates the switching unit 18 in an off state.

The switching unit 18 supplies power to the emitter 31 and the DLP 32 of the projector 3 in an on state, and stops supplying power to the emitter 31 and the DLP 32 of the projector 3 in an off state. Meanwhile, regardless of whether the switching unit 18 is turned on or off, the battery 7 supplies power to the control board 6A all the time. Therefore, the switching unit 18 can switch the projector 3 between the projecting state and the non-projecting state, namely, switch the emitter 31 between an on state and an off state and the DLP 32 between an operational state and a stop state, while maintaining an activated state of the control board 6A, in response to an operation input into the operation unit 4.

In this way, the projecting state and the non-projecting state of the projector 3 can be switched in response to the switching between an on state and an off state of the switching unit 18, in response to an operation performed by the operator on the switch 4 (operation unit 4). Therefore, the image projection device 1 of the present embodiment can be transitioned into the non-projecting state appropriately in the case where it is not necessary to project an image even if being operated, and consequently, it is possible to control the power consumption, to extend the life of the projector 3, and to reduce the amount of heat generation. Also, an activated state of the control board 6A is maintained even when the projector 3 is in the non-projecting state; therefore, compared to a configuration in which both the projector 3 and the control board 6A are stopped, for example, as in a conventional standby mode, when going to switch to the projecting state again, the projector 3 can be activated faster. Therefore, it possible to project an image more swiftly in response to a switching operation performed by the operator, and hence, to improve the operability of the device.

The switch 4 is a push-button switch. Therefore, while the operator is pressing the switch (i.e., while the operation unit 4 is receiving a pressing operation), the projector 3 is in the projecting state (the emitter 31 is turned on and the DLP 32 is in the operational state), and when the operator's hand moves away from the switch 4 (i.e., while the operation unit 4 is not receiving a pressing operation), the projector 3 transitions into the non-projecting state (the emitter 31 is turned off and the DLP 32 is in the stop state). Therefore, timing at which the operator wants to project an image can be matched with timing to continue pressing the switch 4, and thereby, it is possible to provide a more intuitive operational feeling using a so-called momentary switch for the operator. Also, the switch 4 is a button that allows the operator to switch between projection and non-projection, and can also be referred to as a projection button.

Note that in the example in FIG. 5, although a configuration is exemplified in which the switching unit 18 switches whether to supply power from the control board 6A to both the emitter 31 and the DLP 32, the switching unit 18 may be arranged at a position along the wire 14 at which the switching unit 18 can switch whether to supply power to only one the emitter 31 and the DLP 32. The switching unit 18 simply needs to be capable of at least switching between the projecting state as a state in which an image is projected from the projector 3 to the outside, and the non-projecting state as a state in which an image is not projected from the projector 3 to the outside.

Figure 6:
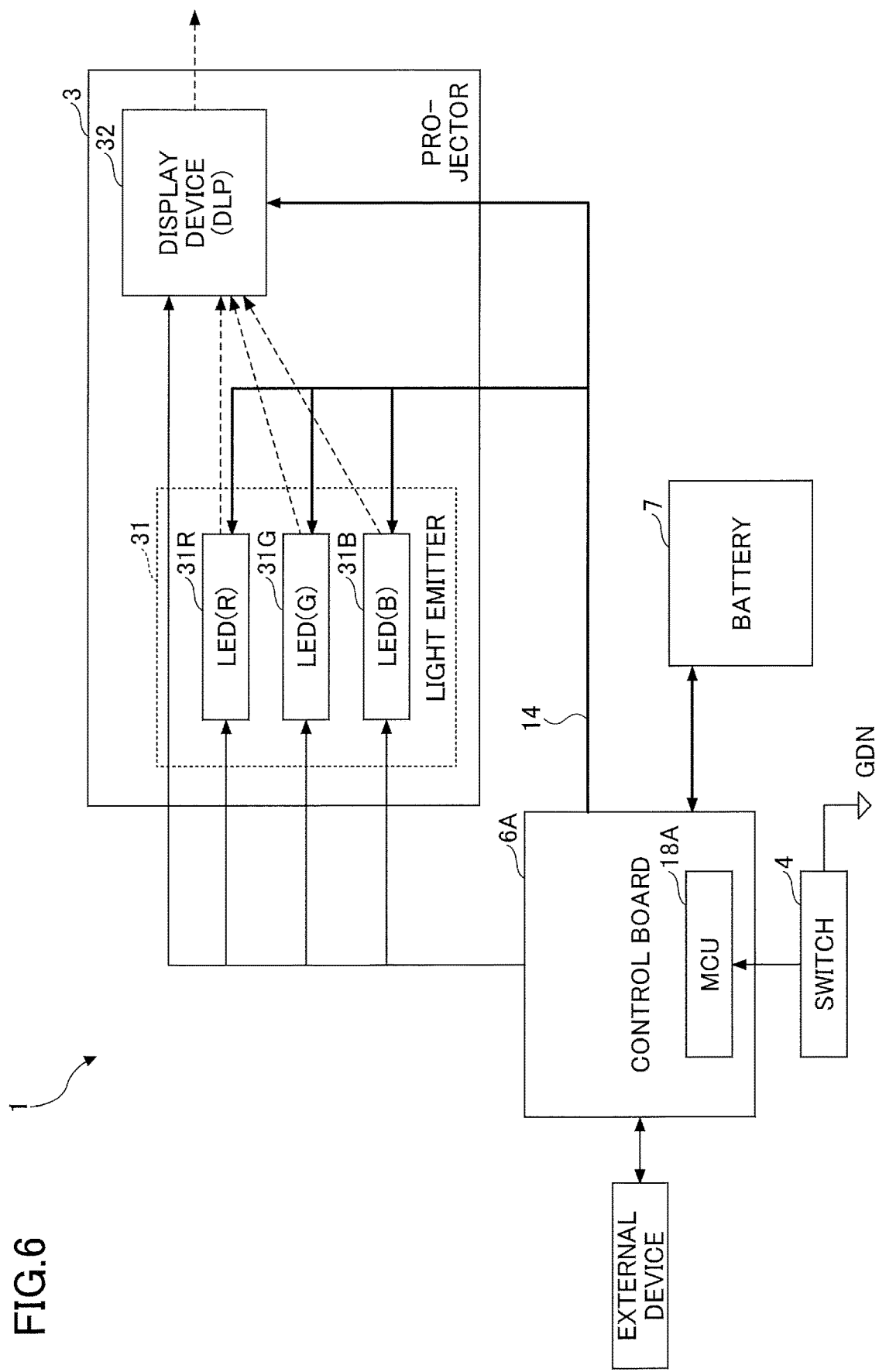
FIG. 6 is a block diagram of a modified example of the image projection device.

FIG. 6 is a block diagram of a modified example of the image projection device 1. The outline of the block diagram illustrated in FIG. 6 is substantially the same as in FIG. 5.

As another configuration example, as illustrated in FIG. 6, the switching unit 18 includes an MCU 18A to detect pressing force on the switch 4, which supplies power to, for example, the emitter 31 and the display device 32 so as to be in the projecting state while detecting the pressing force on the switch 4. In addition, while pressing force is not detected, power is not supplied to the emitter 31 and to the display device 32 so as to be in the non-projecting state. In this case, the control board 6A functions as a switching unit to switch between the projecting state and the non-projecting state.

In other words, in the configuration illustrated in FIG. 6, the control board 6A performs switching electrically as a switching unit that switches the wire 14 connecting the control board 6A with the projector 3, between a conductive state (on state) and a non-conductive state (off state), in response to an operation input on the switch 4 as the operation unit, instead of the switching unit 18 provided on the wire 14 to perform physical switching in FIG. 5.

The control board 6A can control the projecting state and the non-projecting state of the projector 3. The control board 6A has the MCU 18A (Micro Controller Unit) built in. The MCU 18A can detect a pressed/non-pressed state of the switch 4 electrically connected to the control board 6A.

Further, in a momentary mode, the control board 6A supplies power to the projector 3 through the wire 14 while the switch 4 is being pressed to be in the projecting state, based on information on the pressed/non-pressed state of the switch 4 detected by the MCU 18A.

In other words, in the case of the modified example illustrated in FIG. 6, the control board 6A functions as a switching unit that switches whether to supply power to the projector 3 in response to a pressing operation on the switch 4 (operation unit).

Note that in FIG. 6, although the switch 4 is connected to the ground (GND) to detect the pressed/non-pressed state of the switch 4 by a change from the reference voltage, it is not limited as such as long as the pressed/non-pressed state of the switch 4 can be detected.

Figure 7:
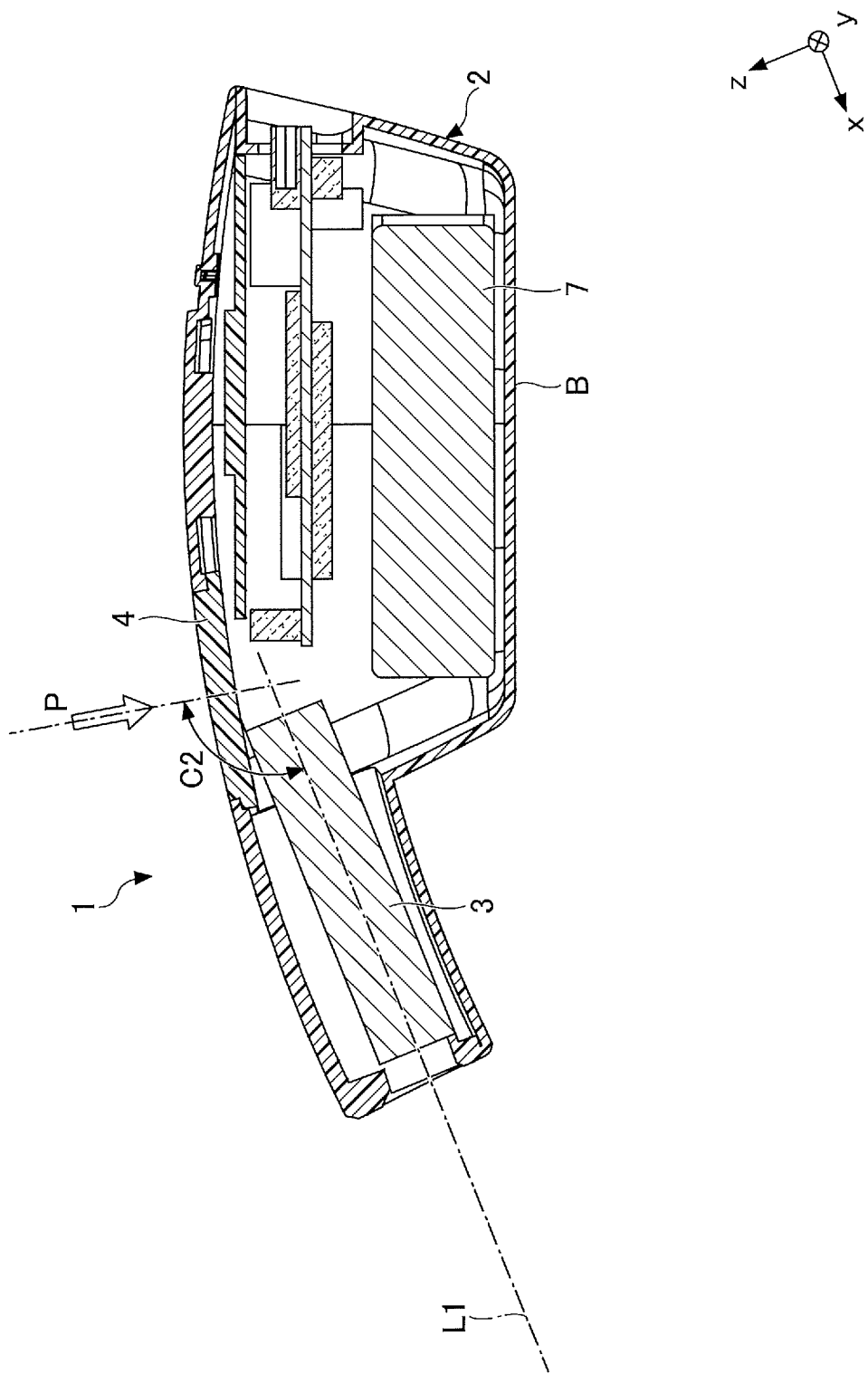
FIG. 7 is a diagram illustrating a relationship between a pressing direction of a switch and a direction of the center line of the optical axis of the projector.
Figure 8:
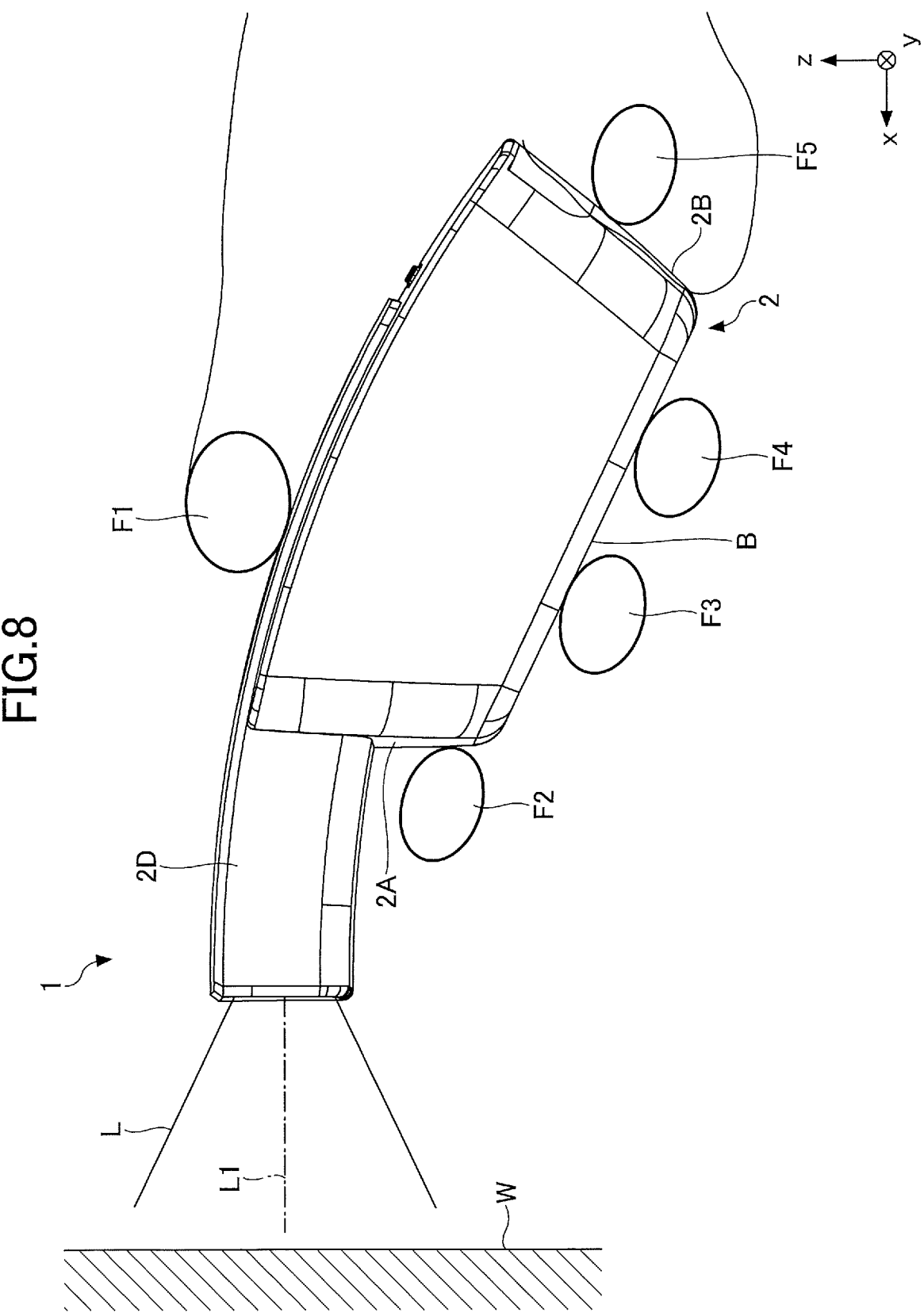
FIG. 8 is a diagram illustrating an example of the use state of the image projection device.

FIG. 7 is a diagram illustrating a relationship between the pressing direction of the switch 4 and the direction of the center line of the optical axis L1 of the projector 3. FIG. 8 is a diagram illustrating an example of the use state of the image projection device 1. As illustrated in FIG. 3, the image projection device 1 emits projection light L from lens part 3A. Here, pay attention to the center line of the optical axis L1 of the projected light L at this time. As illustrated in FIG. 7, in the present embodiment, the switch 4 is installed to make an angle C2 formed between the center line of the optical axis L1 of the projector 3, and a direction P in which the switch 4 switching the projection on and off is pressed vertically with respect to the switch surface, not be equivalent to 90 degrees, but favorably be a blunt angle greater than 90 degrees. Therefore, as illustrated in FIG. 8, when performing projection onto a vertical projection plane W, the operator needs to bend the wrist less, and without posing a stress on the wrist, he/she can press the switch 4 to perform the projection.

The projector 3 includes optical elements such as the lens part 3A, and the "optical axis of the projector 3" corresponds to, for example, the center line of the optical axis of these optical elements.

Also, the image projection device 1 has a structure to project an image from the front end of the convex part 2D protruding from the end 2A of the main body 2; therefore, in a state where the operator manually holds the device, for example, as illustrated in FIG. 8, if holding the device with a position in which the thumb F1 is positioned in the vicinity of the switch 4 on the upper surface of the main body 2; the index finger F2 holds the end 2A of the main body 2; the middle finger F3 and the third finger F4 hold the bottom surface B of the main body 2; and the little finger F5 holds the end 2B on the x-negative direction side of the main body 2, it is possible to securely hold the main body 2 by the entire palm of the hand. With these elements, the operability of the image projection device 1 of the present embodiment can be improved.

As illustrated in FIGS. 1 and 2, it is favorable that the main body 2 is formed to have a dimension of the projector 3 along the up-and-down direction (z direction) of the projection image smaller than a dimension along the left-and-right direction (y direction) of the projection image, namely, to have a shape thin in the z direction. The switch 4 is arranged on an upper part on the surface of the main body 2, which corresponds to the upper side of the projection image (z-positive direction side).

Furthermore, it is favorable that the main body 2 is formed to have a wide rectangular cross-sectional shape (a rectangle, a trapezoidal shape, or the like) viewed in the projection direction (x direction) of the projector 3. It is favorable that the cross-sectional shape of the main body 2 (particularly, the thickness in the z direction) has a size that can be wrapped and held by the fingers of the operator. By forming to have such a shape, the device can be more easily held by the operator with one hand.

Also, it is favorable that the convex part 2D, which protrudes from the main body 2 in the projection direction and has the projector 3 installed, is arranged so as to have its upper surface is flush with the upper surface of the main body 2. Therefore, the upper surfaces of the main body 2 and the convex part 2D facing the palm can be flush, which makes it easier to hold. Also, similarly to the main body 2, it is also favorable that the cross-sectional shape of the convex part 2D in the projection direction (x direction) is a wide rectangular shape, smaller than the rectangular shape of the main body 2, and arranged to be closer to the center of the left-and-right width direction (y direction). By forming the convex part 2D to have such a shape, a step can be formed between the convex part 2D and the main body 2, and by hooking the index finger to this step, the device can be held more stably, and hence, the operability can be improved.

Also, it is favorable that the upper surface of the main body 2 is a curved surface curved toward the bottom surface B side along the projection direction (x direction). This shape of the curved surface can be expressed as "as the cross-sectional shape viewed in the y direction, curved so as to approach the bottom surface B along the x-axis direction", or "as the cross-sectional shape viewed in the y direction, the center of curvature of the curved surface is closer to the bottom surface B than to the upper surface". Further, it is also favorable that the upper surface of the convex part 2D is a curved surface similar to that of the upper surface of the main body 2, and that the curved surface of the upper surface of the main body 2 is connected continuously with the curved surface of the upper surface of the convex part 2D. Here, "connected continuously" can be rephrased that the curvatures of both curved surfaces at the connected points are roughly the same. These elements can also make the device easier to hold. Rephrasing these elements, the upper surface of the main body 2 is curved so as to protrude in the opposite side (z-positive direction side) of the bottom surface B side, and the upper surface of the convex part 2D is also curved so as to protrude in the opposite side of the bottom surface B side. In addition, a continuous surface formed of the upper surface of the main body 2 and the upper surface of the convex part 2D is curved so as to protrude in the opposite side of the bottom surface B side.

Also, the material of the main body 2 may be a resin or metal having good heat conductivity. Therefore, heat generated in the projector 3, the control boards 6A and 6B, the battery 7, and the like can be easily discharged from the surface of the main body 2.

Also, as illustrated in FIGS. 4 and 7, the projector 3 is arranged in the interior of the convex part 2D protruding ahead of the main body 2 held by the operator (the x-positive direction side, in the projection direction). Therefore, it is possible reduce circulation of the heat generated in the projector 3 around a region of the main body 2 held by the hand of the operator, and thereby, to prevent the main body 2 from becoming hot during use.

Also, as illustrated in FIGS. 4, 7, and 8, the projector 3 is arranged higher in the Z-axis direction than the control boards 6A and 6B and the battery 7. In other words, the projector 3 is arranged higher on the z-positive direction side than the control boards 6A and 6B and the battery 7 in the case of the direction of the center line of the optical axis L1 being the horizontal direction when the device is used. Therefore, when projecting onto a vertical projection plane W, it is possible to prevent the heat generated in the projector 3 from circulating in the lower part of the device by heat convection, and to limit the heat-generating region in the main body 2 only to the upper part.

Also, in order to prevent the heat generated in the projector 3 from being retained in the device, the image projection device 1 of the present embodiment is assumed to be held by the operator by hand when being used. By being held and used by the operator by hand, actions are performed by the operator such as grabbing and lifting the image projection device 1, and placing the device on a desk after projection, which can cause movement of air in the interior of the device. Therefore, it is not recommended to install the image projection device 1 on the desk and to press the switch 4 when using it.

Figure 9:
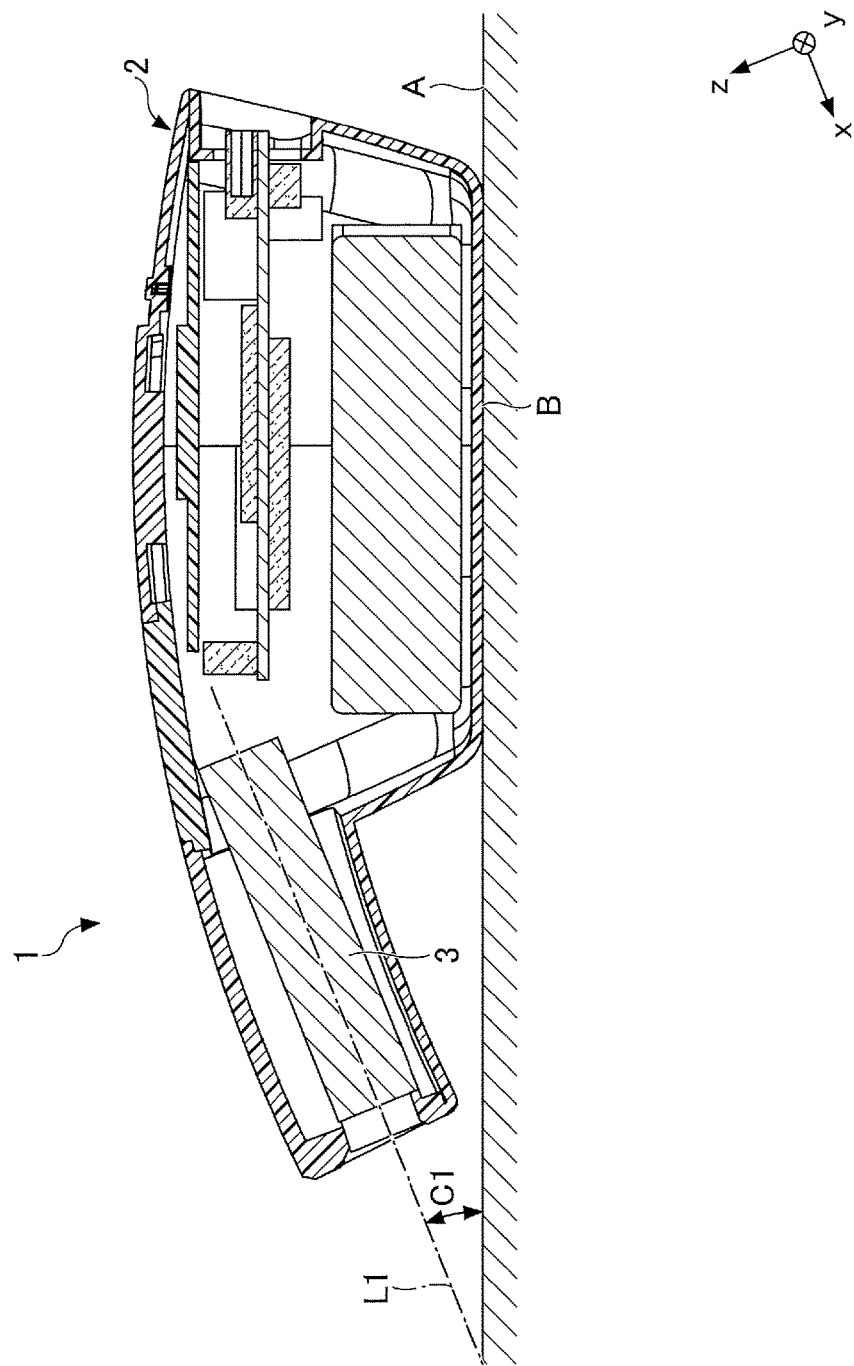
FIG. 9 is a diagram illustrating a state in which the image projection device of the first embodiment is placed on a plane.

FIG. 9 is a diagram illustrating a state in which the image projection device 1 of the first embodiment is placed on a plane A. As illustrated in FIG. 9, in the image projection device 1 of the first embodiment, the projector 3 is arranged so as to make an angle C1 formed between the center line of the optical axis L1 and a plane A, namely, the bottom surface B of the main body, be an acute angle (not be parallel). In other words, the projector 3 is installed so as to have the projection direction directed downward with respect to the horizontal direction when the main body 2 is placed on the plane A. Therefore, in the case of installing the image projection device 1 on the plane A, such as a desk, to perform projection, a trapezoidal image is projected because the projection light L is directed to the plane A. In order to obtain a non-trapezoidal projection image, the operator needs to manually hold and use the main body 2 so as to make the center line of the optical axis L1 orthogonal to the projection plane. Therefore, by installing the projector 3 so as to make the angle C1 formed between the center line of the optical axis L1 of the projector 3 and the bottom surface B of the main body be an acute angle, it is possible to encourage the operator of the image projection device 1 to hold and use the projector 3.

Figure 10:
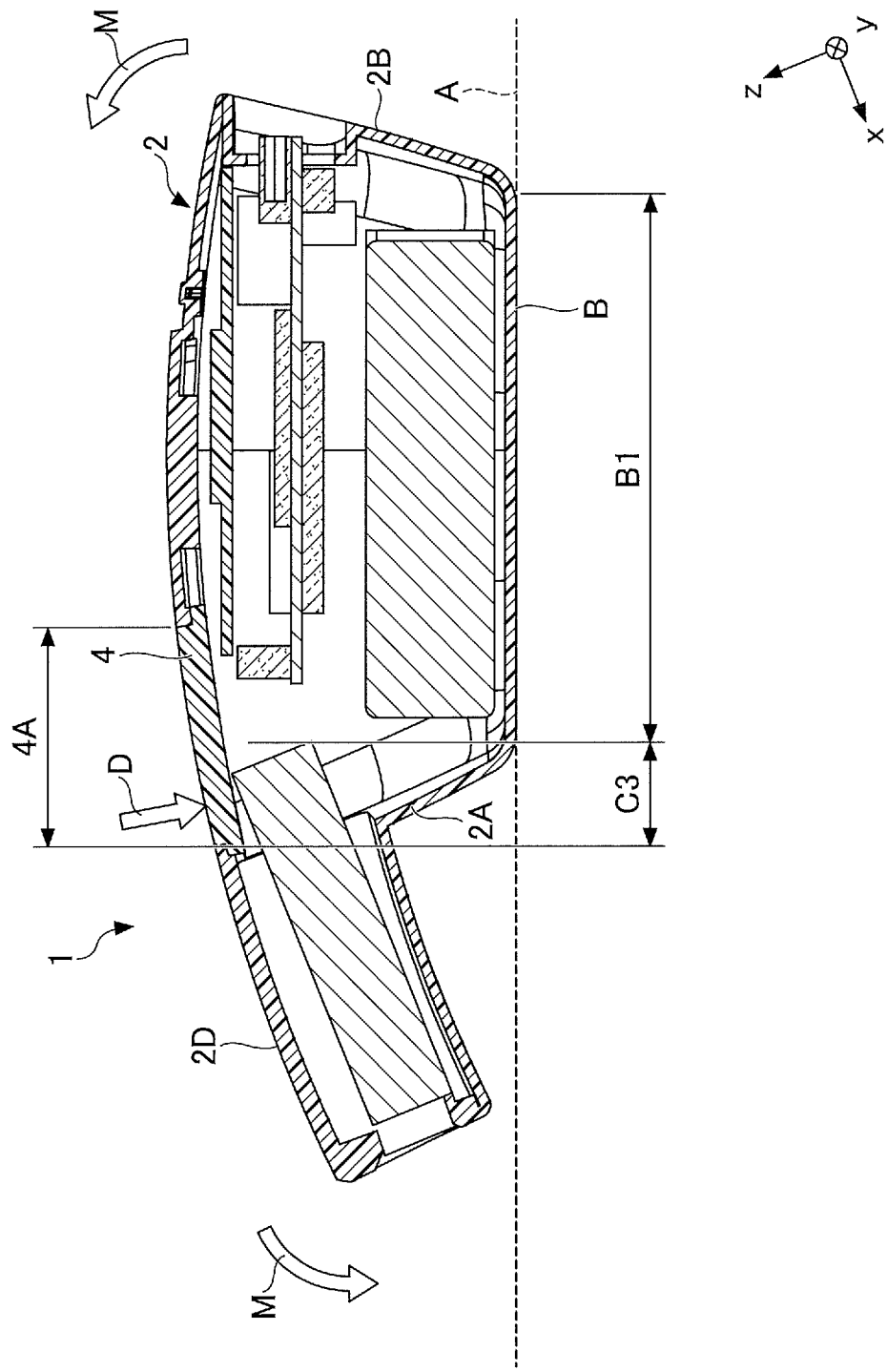
FIG. 10 is a diagram illustrating a positional relationship between a switch and the bottom surface of a main body.

FIG. 10 is a diagram illustrating a positional relationship between the switch 4 and the bottom surface B of the main body. As illustrated in FIG. 10, in the image projection device 1 of the present embodiment, the switch 4 has a part C3 of the switch surface 4A positioned more outward than the bottom surface B1 (ground plane) of the main body. In other words, when the main body 2 is installed on the plane A, the switch 4 is arranged so that the part C3 or the entirety of the vertical projection of the switch 4 onto the plane A (equivalent to the "switch surface 4A" described above) comes on the outside of the bottom surface B1 of the main body 2. Therefore, in the case of installing and using the device on the plane A such as a desk, when an external force D is applied by pressing a part of the switch 4 on the outside of the bottom surface B1 of the main body 2, a moment M is generated on the main body 2, and the device rotates around a corner edge of the bottom surface B of the main body on the x-positive direction side. In other words, as illustrated in FIG. 10, when the switch 4 is pressed, the end 2A side on the x-positive direction side of the main body 2 descends in a direction approaching the plane A side, and the end 2B side on the x-negative direction side ascends in a direction away from the plane A. This makes the installation surface B1 float over the plane A, which unstabilizes the installation state of the main body 2; therefore, it becomes difficult for the operator to operate the switch 4. Therefore, it is possible to encourage the operator of the image projection device 1 to hold and use the device by hand.

Figure 11:
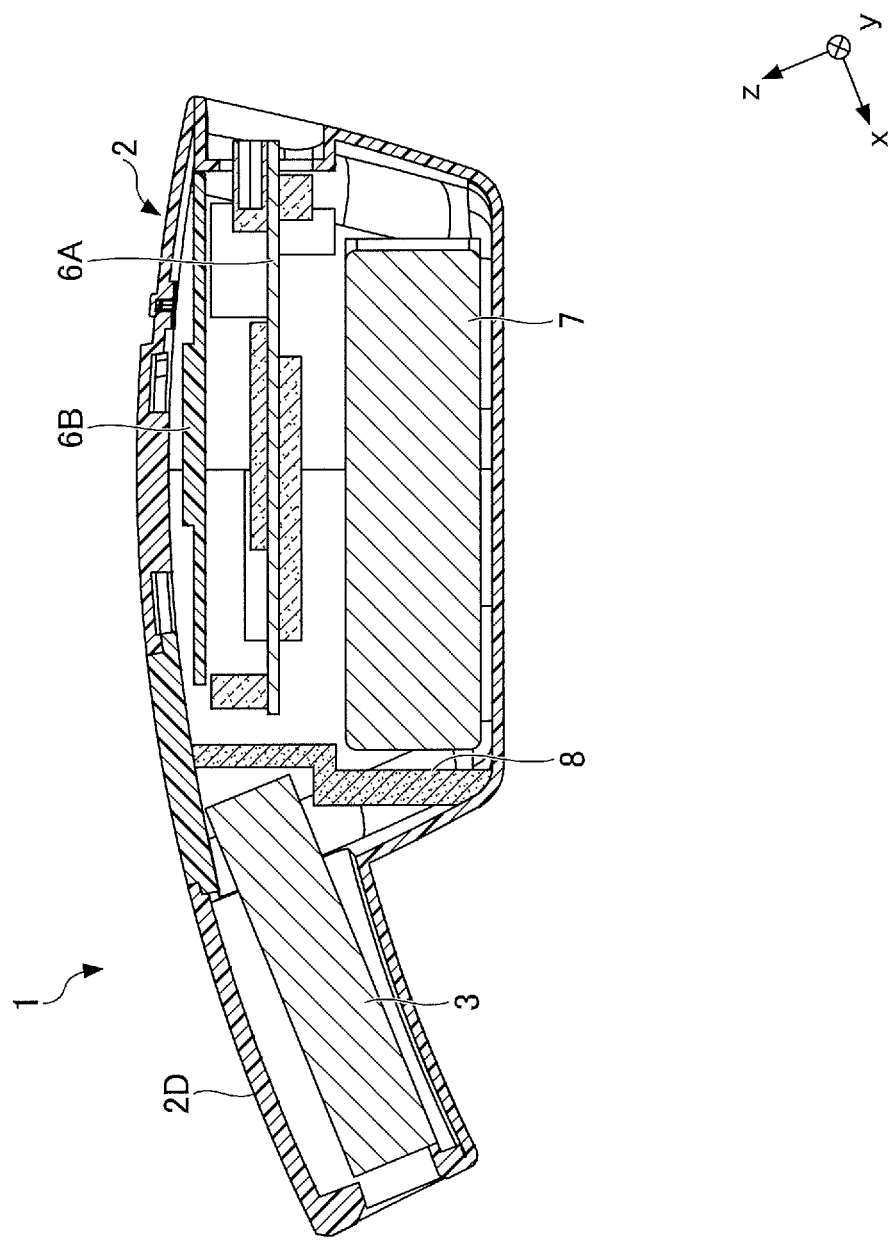
FIG. 11 is a diagram illustrating a first configuration in which a partition is arranged.

FIG. 11 is a diagram illustrating a first configuration in which a partition 8 is arranged. As illustrated in FIG. 11, in the image projection device 1 of the present embodiment, the partition 8 may be provided between the projector 3 housed in the interior of the convex part 2D and the control boards 6A and 6B housed in the interior of the main body 2. This configuration can reduce the heat generated in the projector 3 to circulate into the control boards 6A and 6B side of the main body 2.

Figure 12:
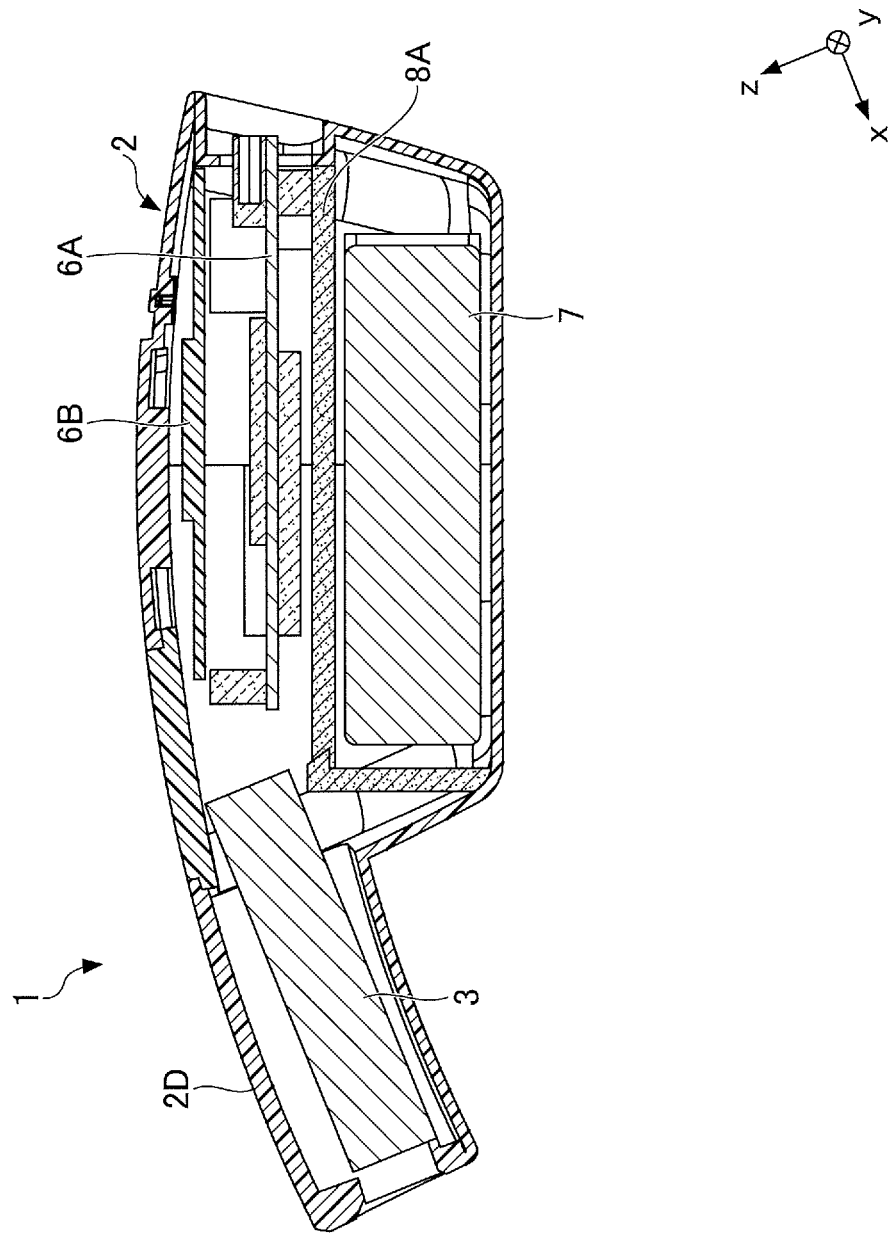
FIG. 12 is a diagram illustrating a second configuration in which a partition is arranged.

FIG. 12 is a diagram illustrating a second configuration in which a partition 8A is arranged. As illustrated in FIG. 12, in the image projection device 1 of the present embodiment, the partition 8A may be provided between the control boards 6A and 6B, and the battery 7 housed in the interior of the main body 2. This configuration can reduce the heat generated in the control boards 6A, 6B, or the battery 7 to be transferred to the other side.

Figure 13:
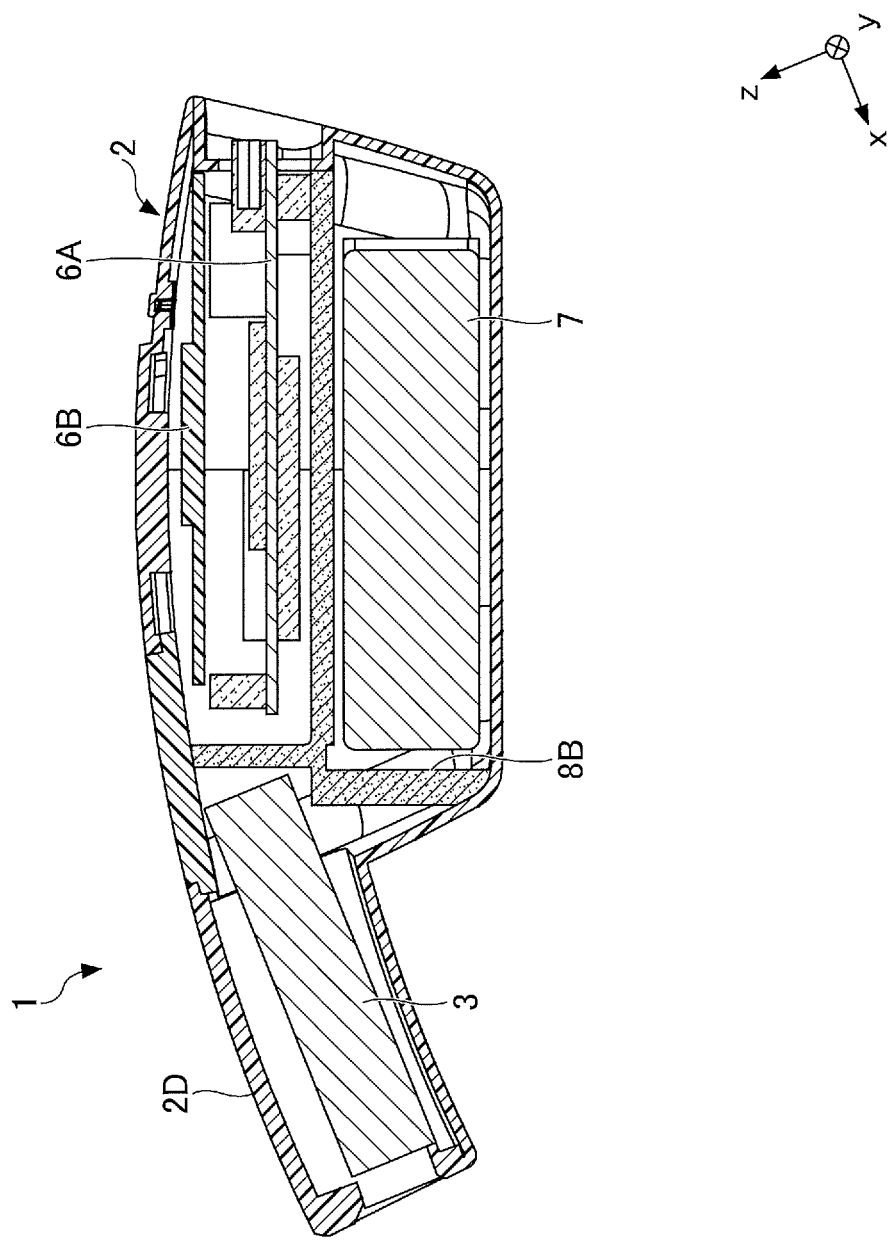
FIG. 13 is a diagram illustrating a third configuration in which a partition is arranged.

FIG. 13 is a diagram illustrating a third configuration in which a partition 8B is arranged. As illustrated in FIG. 13, in the image projection device 1 of the present embodiment, the partition 8B may be configured to separate the projector 3, the control boards 6A and 6B, and the battery 7 from each other. This structure can make the heat generated in each heat source region self-contained, and to make it easier to control the temperature of the respective components.

Figure 14:
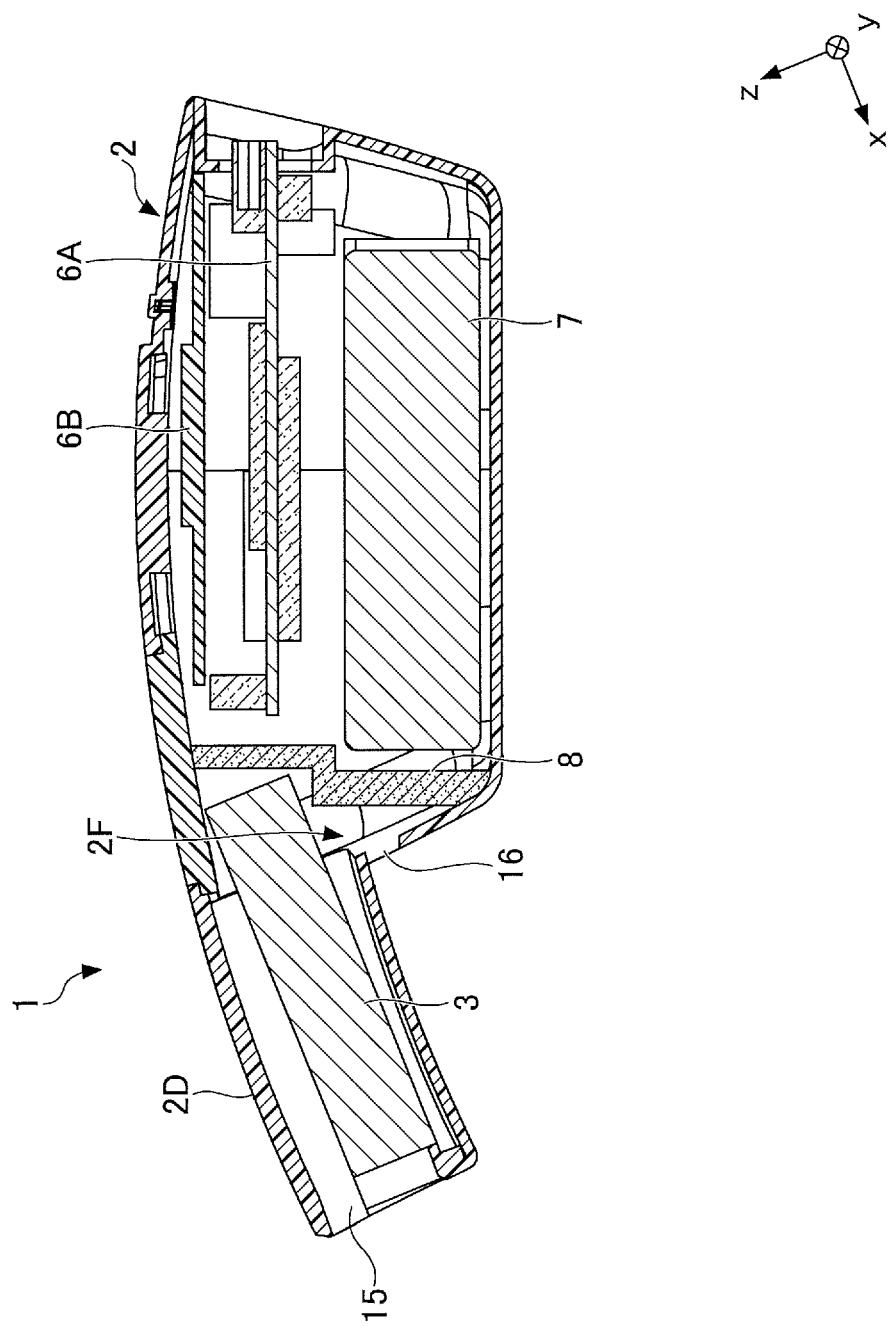
FIG. 14 is a diagram illustrating a first configuration in which holes for cooling the interior are provided in a main body.

FIG. 14 is a diagram illustrating a first configuration in which holes 15 and 16 for cooling the interior are provided in the main body 2. As illustrated in FIG. 14, in the image projection device 1 of the present embodiment, the main body 2 may be provided with the holes 15 and 16 for cooling the interior of the device. An air inlet 16 may be provided on the main body 2 held by the operator by hand, and an air outlet 15 may be provided in the vicinity of the opening 2C at the front end of the convex part 2D. By providing the air outlet 15 in the vicinity of the opening 2C, it is possible to reduce exhaust heat felt by the operator by hand. Also, the air inlet 16 may be installed in a region 2F on the projector 3 side of the main body 2, among regions separated by the partition 8 between the projector 3 and the control boards 6A and 6B. Therefore, the heat generated in the projector 3 can complete the heat convection only within a small region between the air inlet 16 and the air outlet 15.

Figure 15:
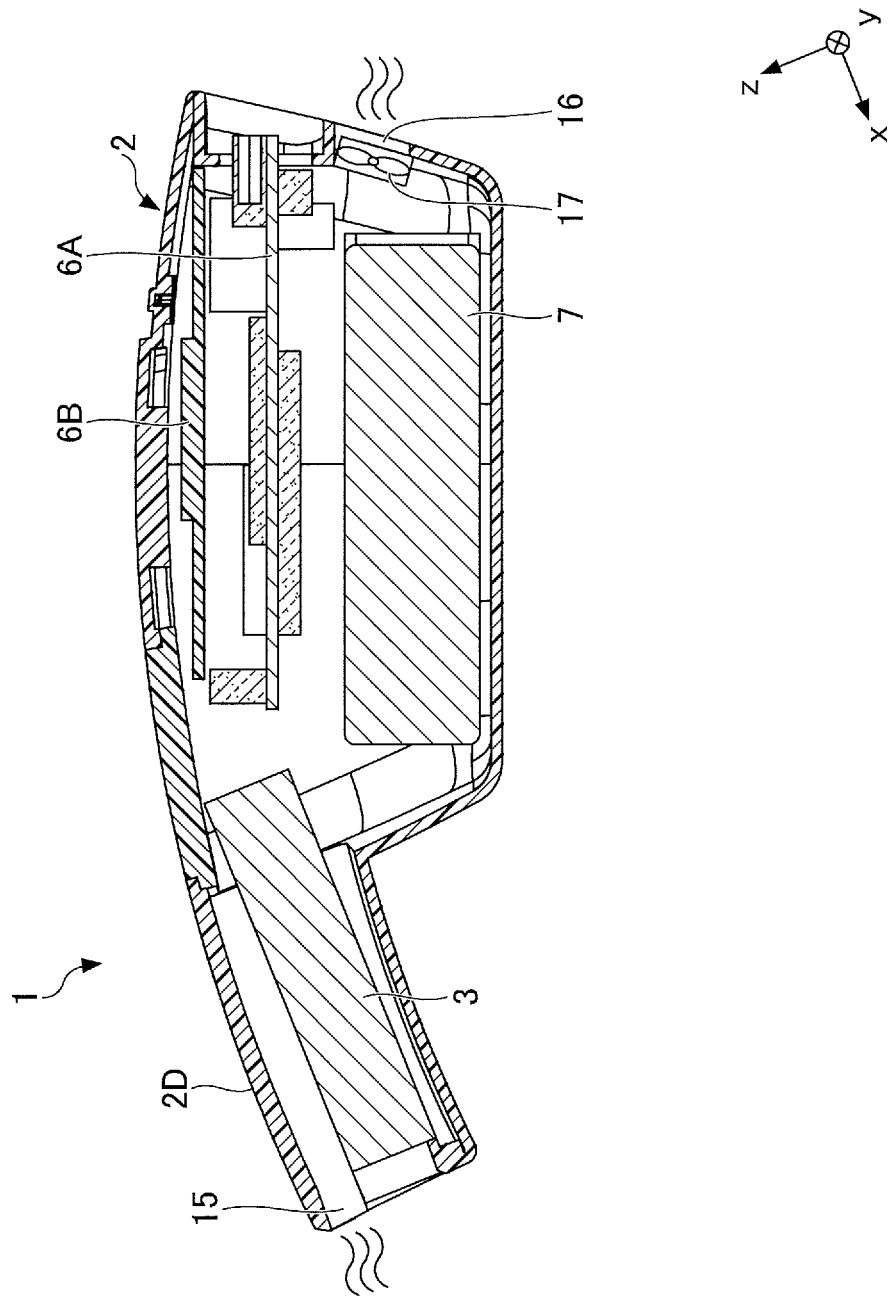
FIG. 15 is a diagram illustrating a second configuration in which holes for cooling the interior are provided in a main body.

FIG. 15 is a diagram illustrating a second configuration in which holes 15 and 16 for cooling the interior are provided in the main body 2. As illustrated in FIG. 15, in the image projection device 1 of the present embodiment, a cooling fan 17 may be installed in the interior of the main body 2. By using the cooling fan 17, it is possible to forcibly cool heat generated in the interior of the device. The cooling fan 17 is provided, for example, in the air inlet 16 provided on the main body 2 to forcibly introduce outside air into the interior of the main body 2 to increase the cooling effect. Also, by providing the air outlet 15 in the vicinity of the opening 2C of the convex part 2D, the operator can use the image projection device 1 without feeling the hot air being exhausted.

Note that the air outlet 15 and the air inlet 16 simply need to introduce air into the interior of the main body 2, and to release the heat in the main body 2 to the outside, and hence, may have shapes selected from among various shapes, for example, slits, instead of the holes.

In recent years, there has been demand for image projection devices of the so-called handy-type, which is hand-held by the operator when projecting images. The handy type is superior in portability compared with conventional fixed-installation types. As use cases in which such a device exhibits the effects, applications such as product explanation and image projection may be assumed, in which images are projected appropriately in the explanation, to deepen the understanding of the audience. In this case, it is important that the operator can turn the projection image on and off at desired timings. In other words, if it is possible to keep the projection turned off until a timing when the projection is desired, and to perform the projection at once when the desired timing of the projection arrives, the operability of the device can be improved conceivably. In addition to being the handy type, the image projection device 1 of the present embodiment can easily switch the projection between on and off in this way; therefore, the operability can be improved.

Second Embodiment

With reference to FIGS. 16 to 22, a second embodiment will be described.

Figure 16:
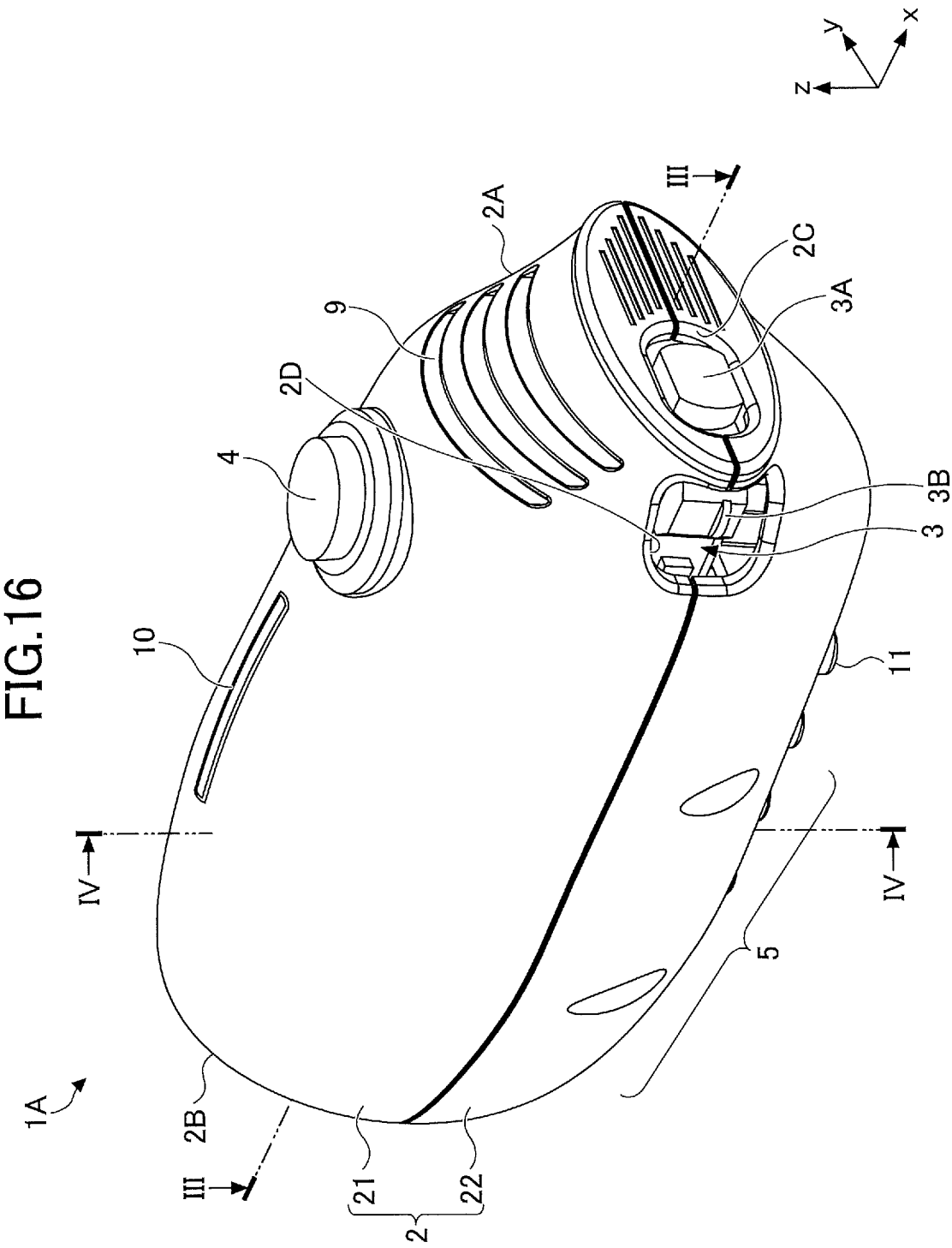
FIG. 16 is a perspective view of an image projection device according to a second embodiment viewed from the z-positive direction side.
Figure 17:
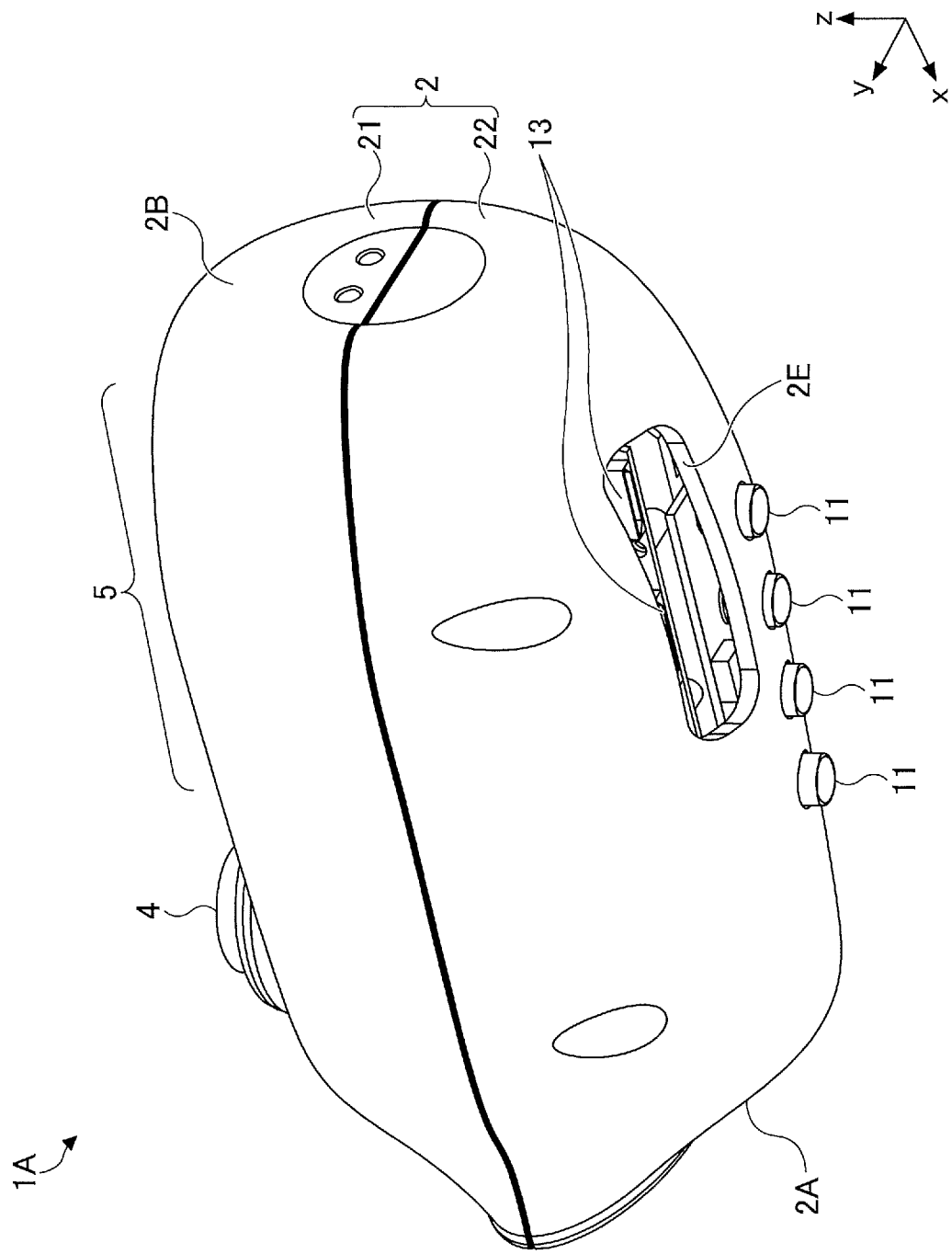
FIG. 17 is a perspective view of the image projection device according to the second embodiment viewed from the z-negative direction side.
Figure 18:
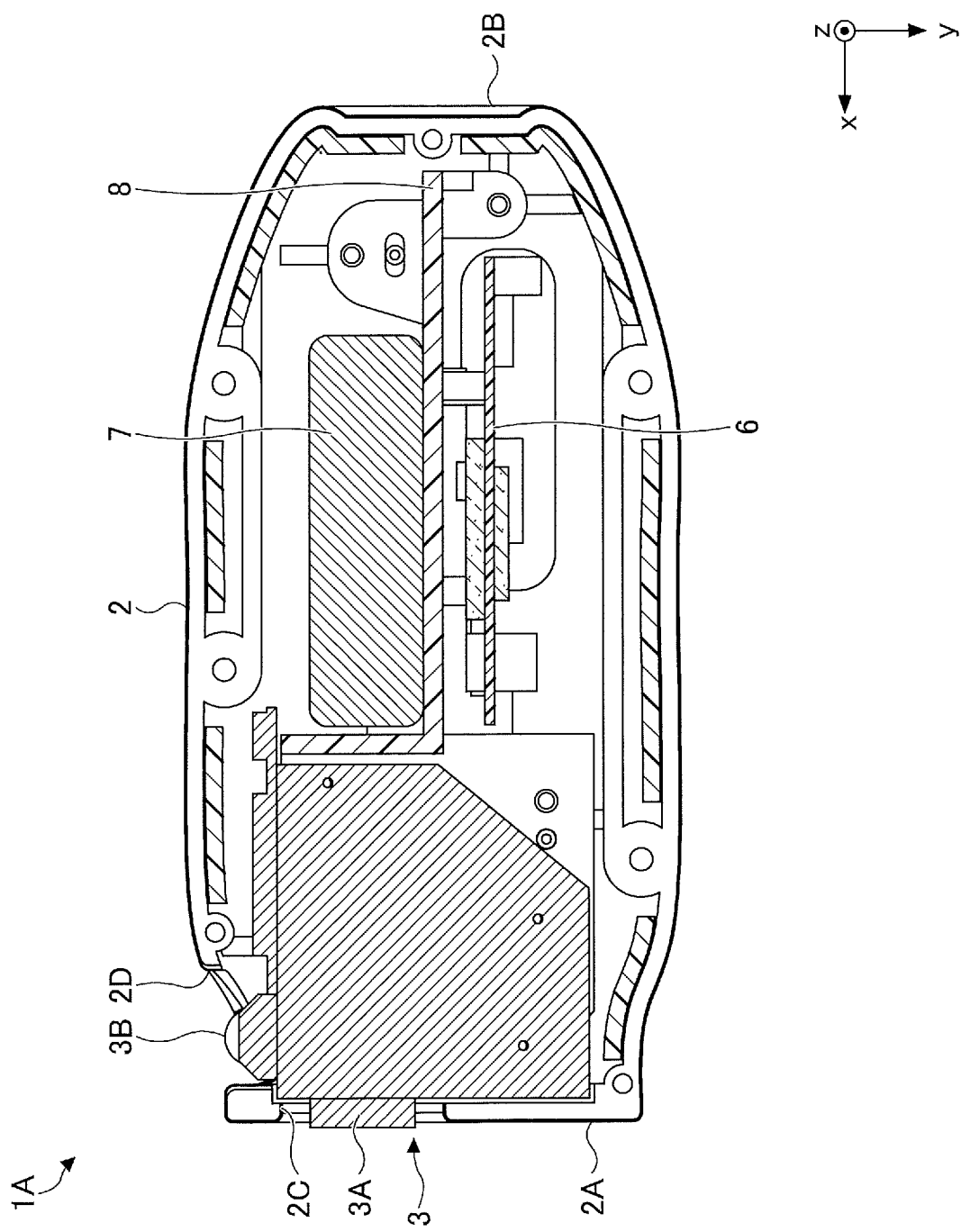
FIG. 18 is a cross-sectional view along a line III-III in FIG. 16.
Figure 19:
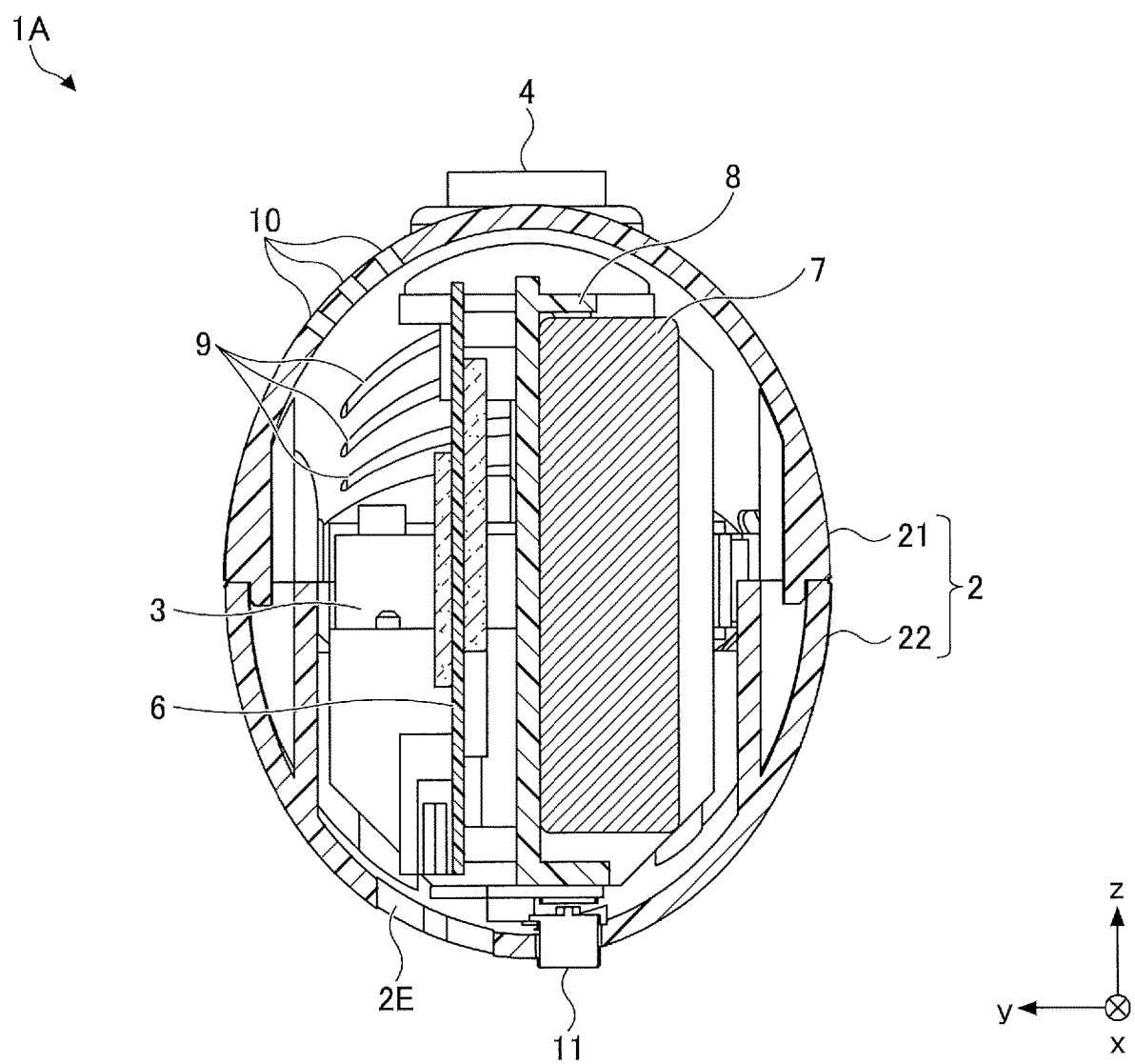
FIG. 19 is a cross-sectional view along a line IV-IV in FIG. 16.

FIG. 16 is a perspective view viewed on the z-positive direction side of an image projection device 1A according to the second embodiment. FIG. 17 is a perspective view viewed on the z-negative direction side of the image projection device 1A according to the second embodiment. FIG. 18 is a cross-sectional view along the line III-III in FIG. 16, which is a longitudinal cross-sectional view of the image projection device 1A along the longitudinal direction. FIG. 19 is a cross-sectional view of the line IV-IV in FIG. 16, which is a lateral cross-sectional view of the image projection device 1A.

The image projection device 1A illustrated in FIGS. 16 to 19 is a so-called handy-type image projection device, which can be held by the operator with one hand when projecting images.

The image projection device 1A includes a main body 2, a projector 3, and a switch 4 (an operation unit). The projector 3 projects an image to the outside. The switch 4 switches the projector 3 between the projecting state and the non-projecting state in response to an operation input. The main body 2 is hollow to house the projector 3 and the other components in the interior of the main body 2.

The switch 4 is arranged on the surface of the main body 2. Note that the switch 4 is an element for the user to input an operation such as pressing by physically touching a finger or the like on it, and the switch 4 may also be referred to as the "operation unit 4" in the following description. Also, the switch 4 is coupled with a switching unit (see FIG. 22, etc.) provided on an electric circuit. The switching unit 18 operating in response to a user operation input on the switch 4 switches a wire 14 between a conducting state and a non-conducting state on the electric circuit, and thereby, switches the projector 3 between the projecting state and the non-projecting state. The operation unit 4 and the switching unit 18 may be configured to be integrally formed as a single switching component, or may be configured to be arranged separately and connected electrically.

The main body 2 can be separated into an upper member 21 and a lower member 22 roughly at the center along the z direction, and by coupling the upper member 21 and the lower member 22 in a state where components are installed in one of the members, the image projection device 1A can assembled to be integrated.

The main body 2 is formed in a shape that can be held by one hand. Specifically, the main body 2 is formed to have a long shape in the longitudinal direction along the projection direction (x direction) of the projector 3. The projector 3 is arranged at an end 2A on the x-positive direction side in the longitudinal direction of the main body 2. An end 2B on the x-negative direction side in the longitudinal direction of the main body 2 is provided with a holder part 5 for the operator to hold the main body 2. The switch 4 is arranged on the projector 3 side relative to the holder part 5.

As illustrated in FIG. 19, it is favorable that the main body 2 is formed to have a dimension of the projector 3 along the up-and-down direction (z direction) of the projection image greater than a dimension along the left-and-right direction (y direction) of the projection image, namely, to have a shape thin in the y direction. The switch 4 is arranged on an upper part of the surface of the main body 2, which corresponds to the upper side of the projection image (z-positive direction side).

Furthermore, as illustrated in FIG. 19, it is favorable that the main body 2 is formed in an oval cross-sectional shape viewed in the projection direction (x direction) of the projector 3. The "oval shape" used in the second embodiment includes an oval, a long oval, an egg shape, and the like, which are curved shapes convex to the outside. Also, the entire outline does not need to be outward convex necessarily, and may be partially inward concave.

Figure 20:
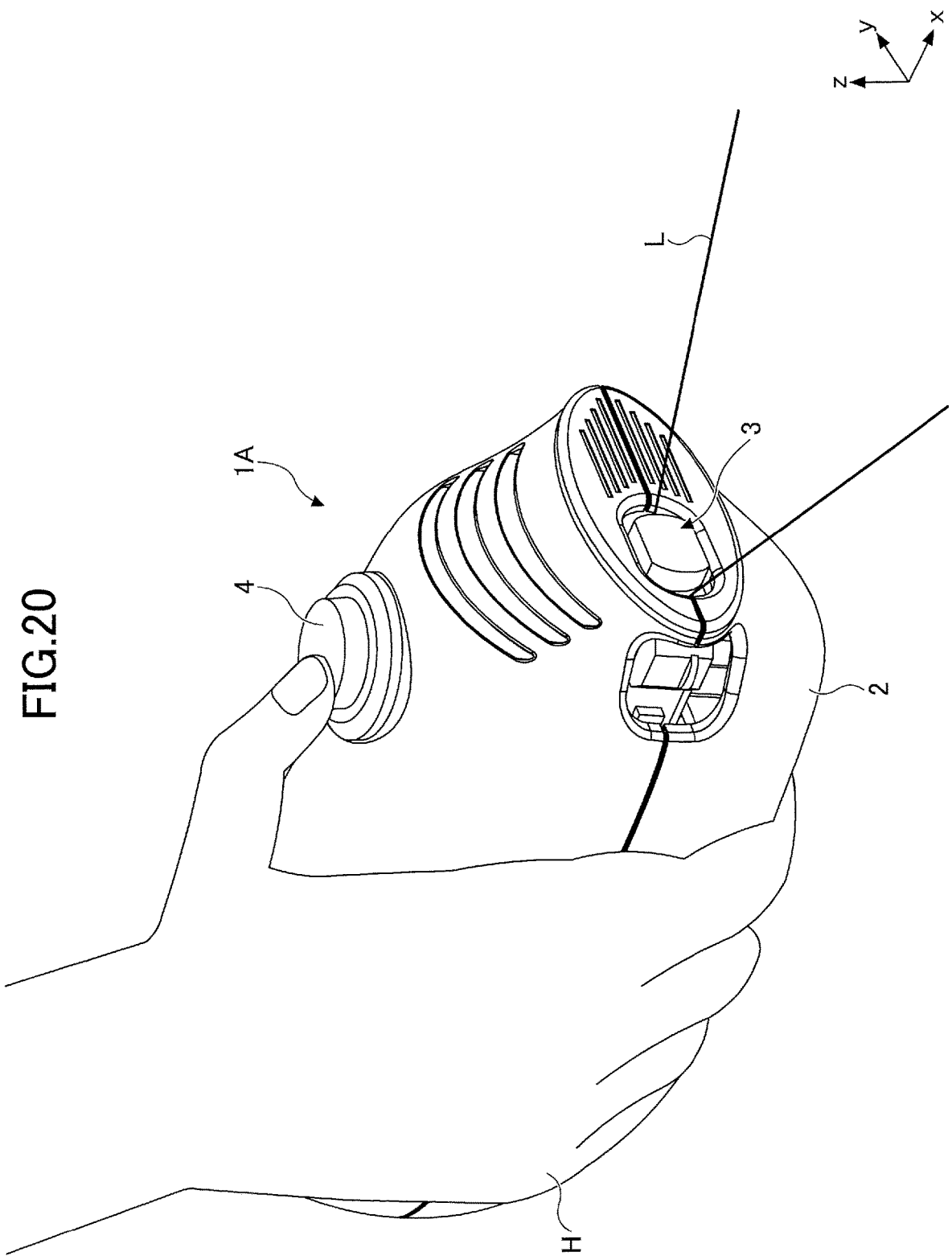
FIG. 20 is a diagram illustrating an example of the use state of the image projection device.

In the second embodiment, by forming the main body 2 to have the shape described above, it becomes easier for the operator to hold the device with one hand. FIG. 20 is a diagram illustrating an example of a use state of the image projection device 1A. As illustrated in FIG. 20, for example, in the case where the operator holds the device with the right hand H, by touching the side of the main body 2 on the y-negative direction side with the center of the palm; covering the curved surface of the lower part (z-negative direction side) of the main body 2 with the four fingers of the index, middle, third, and little fingers; and taking a position to cover the surface of the upper part of the main body 2 (z-positive direction side) by the ball of the thumb to hold the device, the curved shape of the surface of the palm of the hand extends along the oval shape of the surface of the main body 2, and thereby, the operator can hold the main body 2 more securely by the entire palm of the hand. Also, the main body 2 has a shape that is thin in the y direction; therefore, by the four fingers of the index, middle, third, and little fingers, it is possible to hold the main body 2 from the surface on the y-negative direction side to the surface on the y-positive direction side through the surface on the z-negative direction side, which leads to more stable holding.

Also, if holding the main body 2 with positioning the right hand H as above, as illustrated in FIG. 20, the thumb is positioned on the upper surface (z-positive direction side) of the main body 2; therefore, it becomes a position with which the switch 4 can be easily pressed while the main body 2 is being held. This makes it easier for the operator to operate the switch 4; therefore, by performing an operation on the switch 4, it is possible for the operator to emit light L from the projector 3 at a desired timing, and also to stop emitting the light L. Thus, by forming the main body 2 to have the shape described above, the image projection device 1A of the second embodiment can make the stabilized holding compatible with the ease of operation on the switch 4, and thereby, the operability of the device can be improved.

The projector 3 is installed in the main body 2 such that the projection direction extends along the longitudinal direction (x direction) of the main body 2. Also, the projector 3 includes a lens part 3A, and the lens part 3A is installed to be exposed from an opening 2C provided at the front end 2A of the main body 2, and the projector 3 is installed in the main body 2 such that the up-and-down direction of an image projected from the lens part 3A extends along the z direction, and the left-and-right direction of the image extends along the y direction. Also, the projector 3 is equipped with a focus adjustment dial 3B and installed to be exposed through the opening 2C provided on the y-negative direction side of the main body 2. The operator can adjust the focus of a projection image by rotatably operating a focus adjustment dial 3B.

In the image projection device 1A of the second embodiment, by adjusting the press angle according to the shape of part of the switch 4 touched by the fingers, the installation orientation of the switch 4, and the configuration of the connection between the switch 4 and the switching unit as in the case of the image projection device 1 in the first embodiment, it is possible to make the angle formed between the center line of the optical axis of the projected light L of the projector 3 and the direction in which the switch 4 switching the projection on and off is pressed vertically with respect to the switch surface, not be equivalent to 90 degrees, and favorably be an obtuse angle greater than 90 degrees. Therefore, as in the first embodiment, as illustrated in FIG. 8, when performing projection onto a vertical projection plane W, the operator needs to bend the wrist less, and without posing a stress on the wrist, he/she can press the switch 4 to perform the projection.

Figure 21:
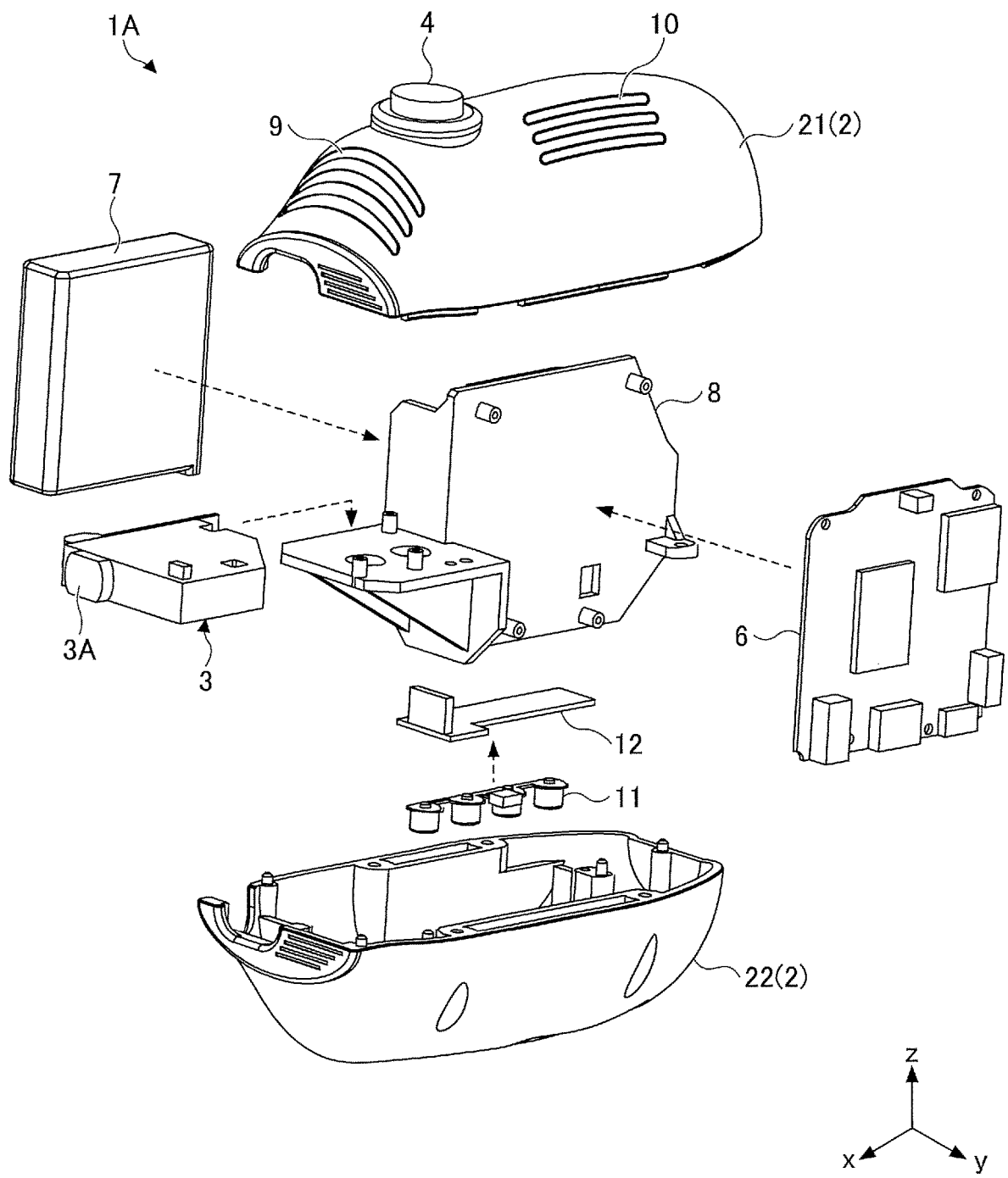
FIG. 21 is an exploded perspective view of the image projection device.

Next, in addition to FIGS. 18 and 19, with reference to FIGS. 21 and 22, the internal structure of the image projection device 1A will be described. FIG. 21 is an exploded perspective view of the image projection device 1A.

As illustrated in FIG. 21, the image projection device 1A includes the projector 3 housed in the interior of the main body 2 described above, a control board 6 (controller), and a battery 7 (power supply).

The control board 6 controls operations of the projector 3. The control board 6 can be physically configured as a computer system in which a CPU, a RAM, a ROM, a storage device, interfaces, and the like are connected via a bus. Various functions of the control board 6 are implemented by loading predetermined computer software on the hardware such as the CPU and the RAM; performing reading and writing data on the RAM and the storage device under control of the CPU; and operating the other components such as the projector 3 and external devices through the interfaces.

The battery 7 is a power supply to supply power to the projector 3 and the control board 6, which is a plate-shaped secondary battery.

The control board 6 and the battery 7 are arranged closer to the end 2B than the projector 3 so as to have the principal surfaces of the respective plate shapes face each other along the left-and-right direction (y direction) of the projection image of the projector 3, and thereby, configured such that the dimension in the y direction of the main body 2 can be shortened.

It is favorable to provide a partition 8 to separate the housing space of the projector 3, the control board 6, and the battery 7 in the interior of the main body 2. The partition 8 separates the interior space of the main body 2 into three housing spaces, which are a housing space of the projector 3, a housing space of the control board 6, and a housing space of the battery V. Also, each of the projector 3, the control board 6, and the battery 7 is fixed to the partition 8 by screws or the like. By providing the partition 8 as such, it is possible to suppress transfer of heat generated in the projector 3 and/or the control board 6 to the battery 7, and hence, to suppress deterioration of the battery 7 due to the heat.

As illustrated in FIGS. 16, 19 and 21, on the surface of the main body 2, at a position on the upper side (z-positive direction side) of a projection image from the projector 3, it is favorable to provide slits 9 for radiating heat generated in the projector 3 (openings for heat radiation). Also, on the surface of the main body 2, at a position on the upper side of a projection image (z-positive direction side) from the control board 6, it is favorable to provide slits 10 for radiating heat generated in the control board 6 (openings for heat radiation). By providing the slits 9 and 10 as such, it is possible to easily discharge the heat generated in the projector 3 and/or the control board 6 to the outside, and thereby, to prevent the heat from being confined in the interior of the main body 2; therefore, it is possible to further suppress the deterioration of the battery 7 due to the heat. Note that the slits 9 and 10 simply need to be capable of discharging the heat in the interior of the main body 2 to the outside, and may be shaped as holes instead of the slits.

As illustrated in FIGS. 17 and 19, a group of buttons 11 and an opening 2E are provided on the surface on the z-negative direction side of the main body 2. The group of buttons 11 includes multiple buttons for operating various functions of the projection device such as a main power supply. The group of buttons 11 is connected to a substrate for detecting buttons 12 illustrated in FIG. 21, and the substrate for detecting buttons 12 is electrically connected to the control board 6. When any of the buttons of the group of buttons 11 is pressed, the substrate for detecting buttons 12 detects the press, and outputs it to the control board 6. In the opening 2E, connectors 13 such as a USB connector and an HDMI (registered trademark) connector are arranged to be exposed, and configured to be connectable by wire with various external devices. The connectors 13 are installed, for example, on the control board 6.

Figure 22:
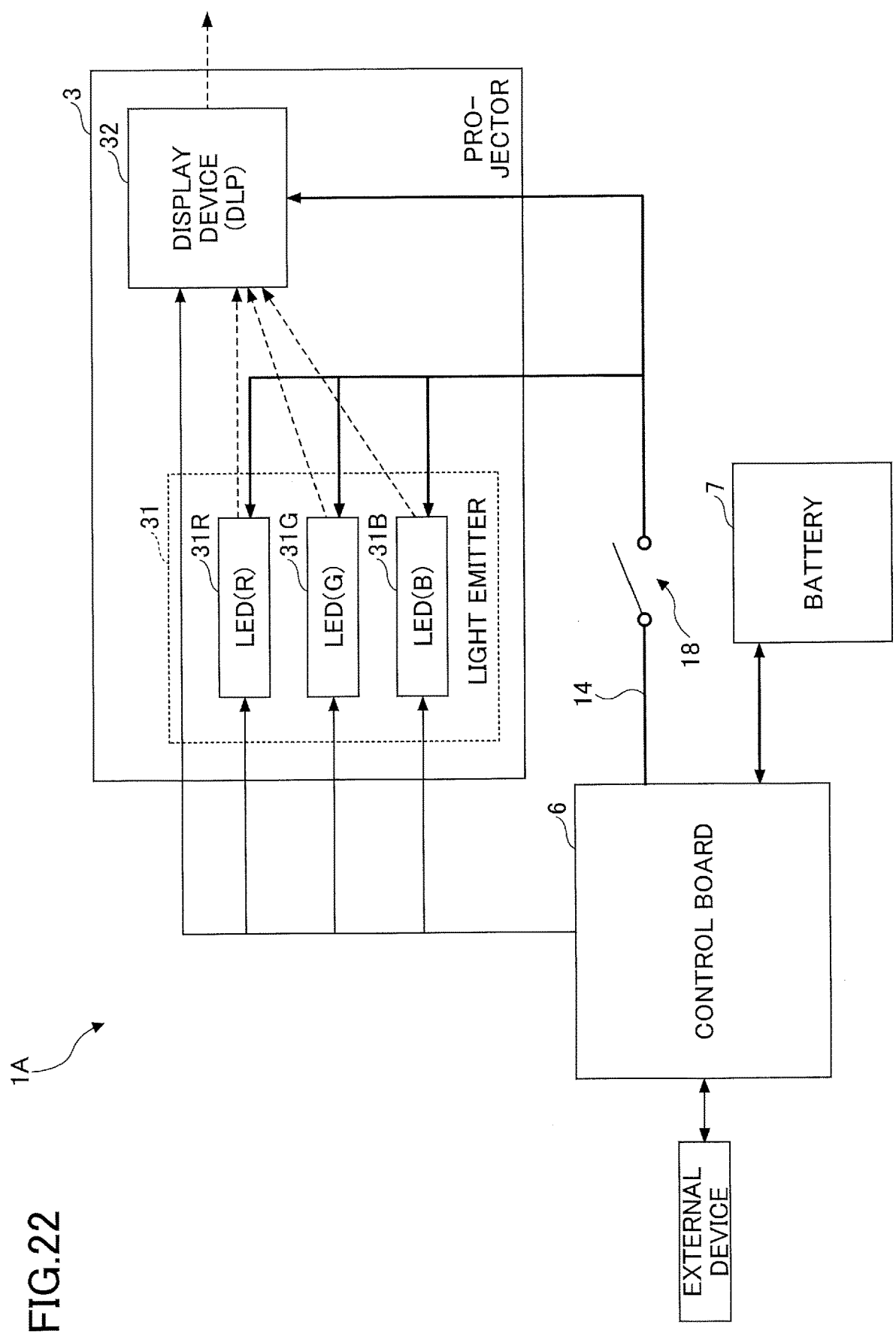
FIG. 22 is a block diagram of the image projection device.

FIG. 22 is a block diagram of the image projection device 1A. As illustrated in FIG. 22, the projector 3 includes an emitter 31 and a DLP (Digital Light Processing) 32 as a display device. The emitter 31 includes LEDs 31R, 31G, and 31B. The LEDs 31R, 31G, and 31B are light sources of red color (R), green color (G), and blue color (B), respectively. The DLP 32 is an image forming unit that forms a projection image through light output from the emitter 31 and outputs the image to the outside. Note that the emitter 31 and the DLP 32 may be replaced with other elements capable of performing the respective functions.

In FIG. 22, the information transmission system of the image projection device 1A is designated with solid lines, the power supply system is designated with thick solid lines, and the optical system is designated with by dotted lines. As illustrated in FIG. 22, the information transmission system of the image projection device 1A outputs control signals from the control board 6 to the emitter 31 and the DLP 32 of the projector 3. Also, the power supply system of the image projection device 1A first supplies the power to the control board 6 from the battery 7, and further supplies the power from the control board 6 through the wire 14 to the emitter 31 and the DLP 32 of the projector 3. In addition, particularly in the present embodiment, the switching unit 18 is arranged on the wire 14 between the control board 6 and the projector 3. The switching unit 18 can be switched between an on state and an off state by an operation input on the switch 4 as the operation unit.

The switching unit 18 supplies power to the emitter 31 and the DLP 32 of the projector 3 in an on state, and stops supplying power to the emitter 31 and the DLP 32 of the projector 3 in an off state. Meanwhile, regardless of whether the switching unit 18 is, turned on or off, the battery 7 supplies power to the control board 6 all the time. Therefore, the switching unit 18 can switch the projector 3 between the projecting state and the non-projecting state, namely, switch the emitter 31 between an on state and an off state and the DLP 32 between an operational state and a stop state, while maintaining an activated state of the control board 6, in response to an operation input into the operation unit 4.

In this way, the projecting state and the non-projecting state of the projector 3 can be switched in response to the switching between an on state and an off state of the switching unit 18 in response to an operation performed by the operator on the switch 4 (operation unit 4). Therefore, the image projection device 1A of the second embodiment can be transitioned into the non-projecting state appropriately in the case where it is not necessary to project an image even if being operated, and consequently, it is possible to control the power consumption, to extend the life of the projector 3, and to reduce the amount of heat generation. Also, an activated state of the control board 6 is maintained even when the projector 3 is in the non-projecting state; therefore, compared to a configuration in which both the projector 3 and the control board 6 are stopped, for example, as in a conventional standby mode, when switching to the projecting state again, the projector 3 can be activated faster. Therefore, it possible to project an image more swiftly in response to a switching operation performed by the operator, and hence, to improve the operability of the device.

The switch 4 is a push-button switch. Therefore, while the operator is pressing the switch 4, the projector 3 is in the projecting state (the emitter 31 is turned on and the DLP 32 is in the operational state), and when the operator's hand moves away from the switch 4, the projector 3 transitions into the non-projecting state (the emitter 31 is turned off and the DLP 32 is in the stop state). Therefore, timing at which the operator wants to project an image can be matched with timing to continue pressing the switch 4, and thereby, it is possible to provide a more intuitive operational feeling using a so-called momentary switch for the operator. Also, the switch 4 is a button that allows the operator to switch between projection and non-projection, and can also be referred to as a projection button.

Note that in the example in FIG. 22, although a configuration is exemplified in which the switching unit 18 switches whether to supply power from the control board 6 to both the emitter 31 and the DLP 32, the switching unit 18 may be arranged at a position along the wire 14 at which the switching unit 18 can switch whether to supply power to only one the emitter 31 and the DLP 32. The switching unit 18 simply needs to be capable of at least switching between the projecting state as a state in which an image is projected from the projector 3 to the outside, and the non-projecting state as a state in which an image is not projected from the projector 3 to the outside.

Third Embodiment

Figure 23:
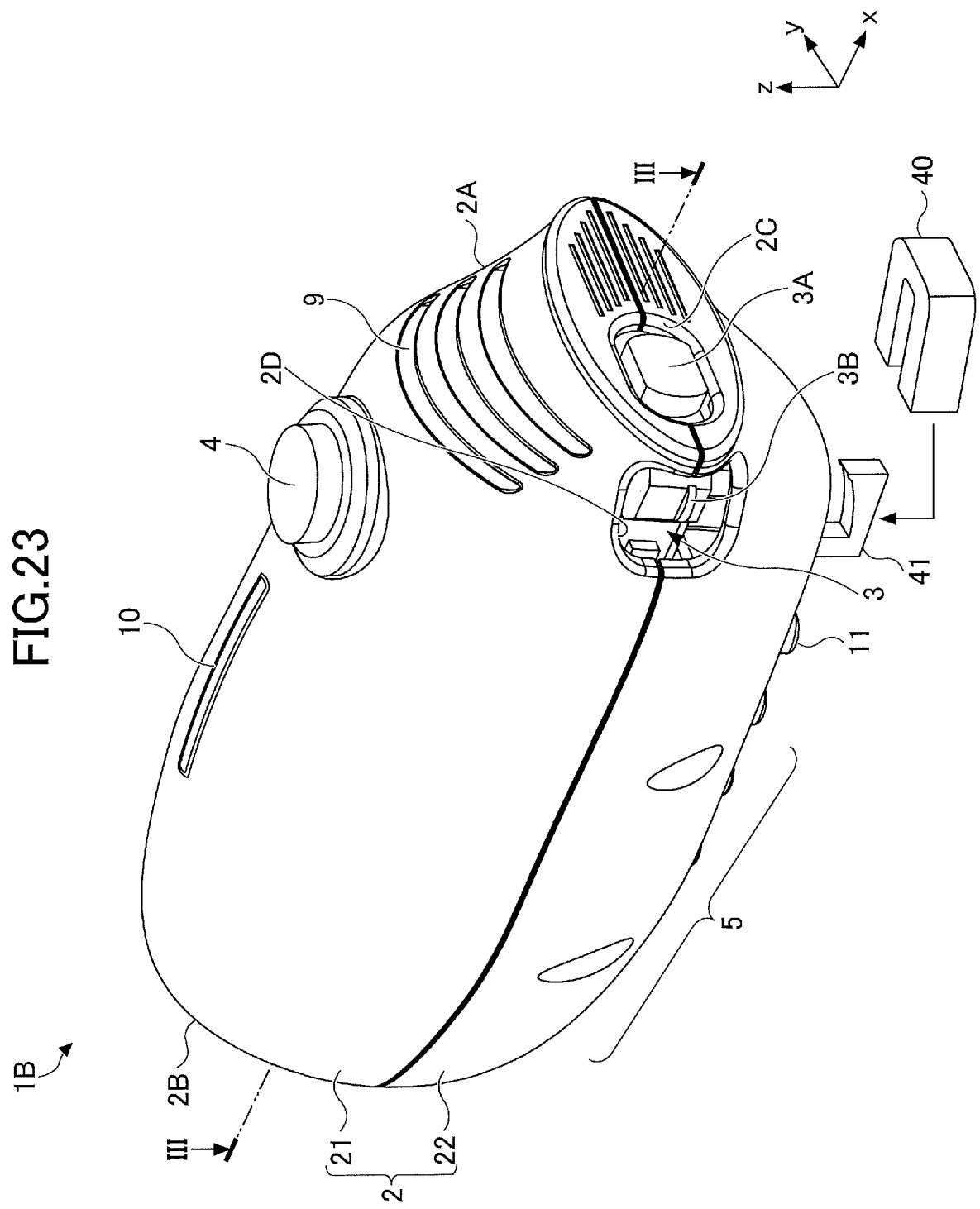
FIG. 23 is a perspective view of an image projection device according to a third embodiment viewed from the z-positive direction side.

With reference to FIGS. 23 to 27, a third embodiment will be described. FIG. 23 is a perspective view viewed on the z-positive direction side of an image projection device 1B of the third embodiment.

As illustrated in FIG. 23, the image projection device 1B is provided with a sensor 40 (detection unit) on the surface of the main body 2. The sensor 40 detects a state of the image projection device 1B. The state of the image projection device 1B detected by the sensor 40 includes, for example, information on the temperature, position, projection direction, and the like of the light source under operation.

In the third embodiment, based on the information detected by the sensor 40, it is possible to control the projection image output by the projector 3, in response to a change in the environment in which the image projection device 1B is used, so as to adjust the projection image to be seen easily. This control is also referred to as "projection image output control" in the following.

The sensor 40 may be configured detachable from and attachable to the surface of the main body 2 as illustrated in FIG. 23. For example, as illustrated in FIG. 23, the main body 2 of the image projection device 1B is provided with a claw 41 protruding downward (z-negative direction direction) on a lower part of the frond end 2A. The sensor 40 is fixed to the lower end side of the forward end 2A of the main body 2 by engaged with the claw 41. The operator can select whether to perform the projection image output control, by attaching the sensor 40 to the main body 2 to perform the projection image output control so as to obtain projection images that can be easily seen at all times, or alternatively, by detaching the sensor 40 from the main body 2 to make the device light and compact.

Note that the sensor 40 may be configured to be provided in the interior of the main body 2.

Figure 24:
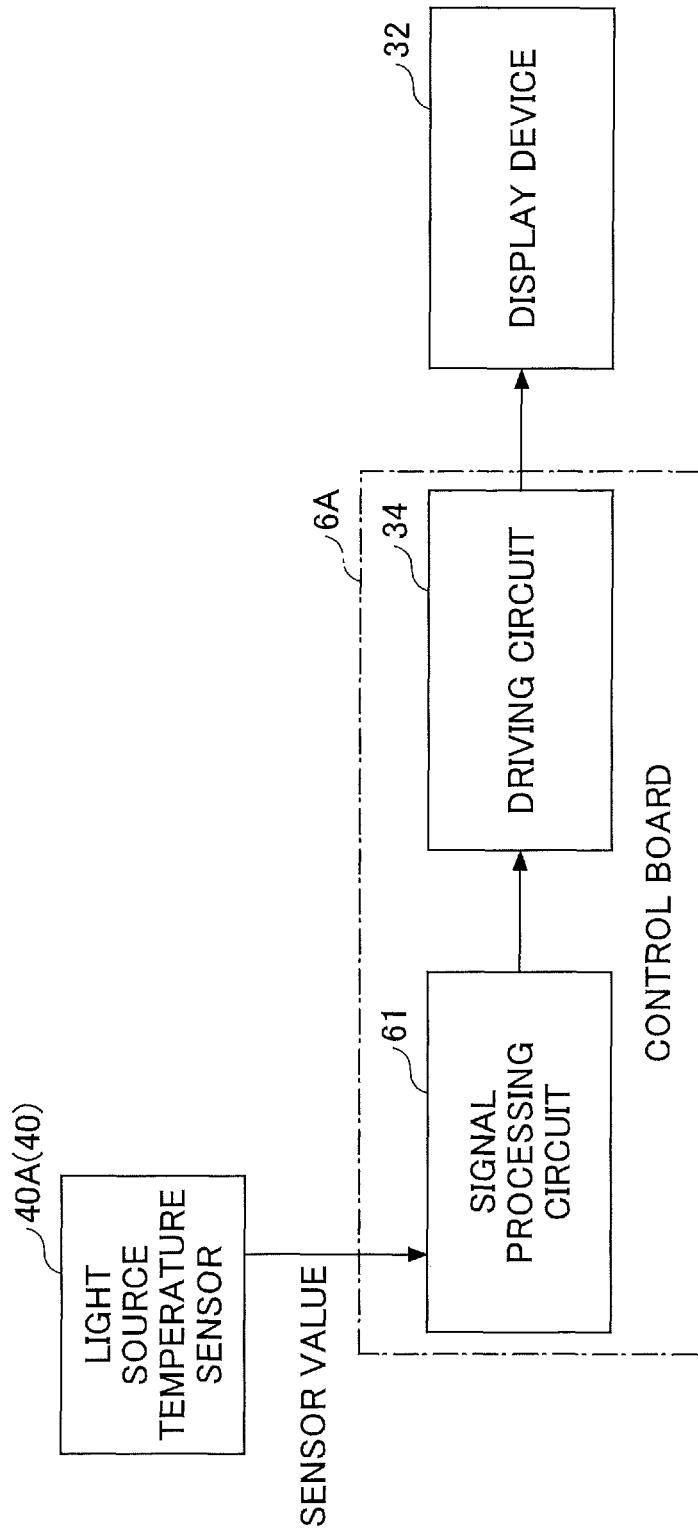
FIG. 24 is a block diagram of a first configuration of projection image output control.

FIG. 24 is a block diagram of a first configuration of projection image output control. In the first configuration, as the sensor 40, a temperature sensor 40A to measure the temperature of the emitter 31 (see FIG. 25) is used. In the first configuration, as the information on the state of the IP Device 1B, the temperature of the emitter 31 is detected. Also, in the first configuration, the projection image output by the projector 3 is controlled so that hues of projection images become stable (hue change suppressing processing).

The temperature sensor 40A is connected to the signal processing circuit 61 to be communicatable. The signal processing circuit 61 is connected to a driving circuit 34, and the driving circuit 34 is connected to the display device 32 of the projector 33. The signal processing circuit 61 and the driving circuit 34 are included in the control board 6A. The signal processing circuit 61 receives as input a sensor value detected by the temperature sensor 40A, to apply image processing based on the sensor value to the input video signal on the signal processing circuit 61. In short, it is configured to be capable of changing a projection image by the sensor 40 according to the use environment of the image projection device 1B.

As the temperature of the emitter 31 becomes higher, the emission spectrum of the emitter 31 changes; therefore, if the image processing by the signal processing circuit 61, the driving circuit 34, and the display device 32 is performed uniformly, the hues of projection images will change. Thereupon, in the first configuration of the third embodiment illustrated in FIG. 24, a sensor value (temperature of the light source) detected by the temperature sensor 40A in the emitter 31 of the projector 3 of the image projection device 1B is input into the signal processing circuit 61, to change the image processing applied to the input video signal, depending on the temperature of the light source. This configuration can reduce the effect of changes in the emission spectrum due to the temperature change, and to stabilize the hues of projection images.

Figure 25:
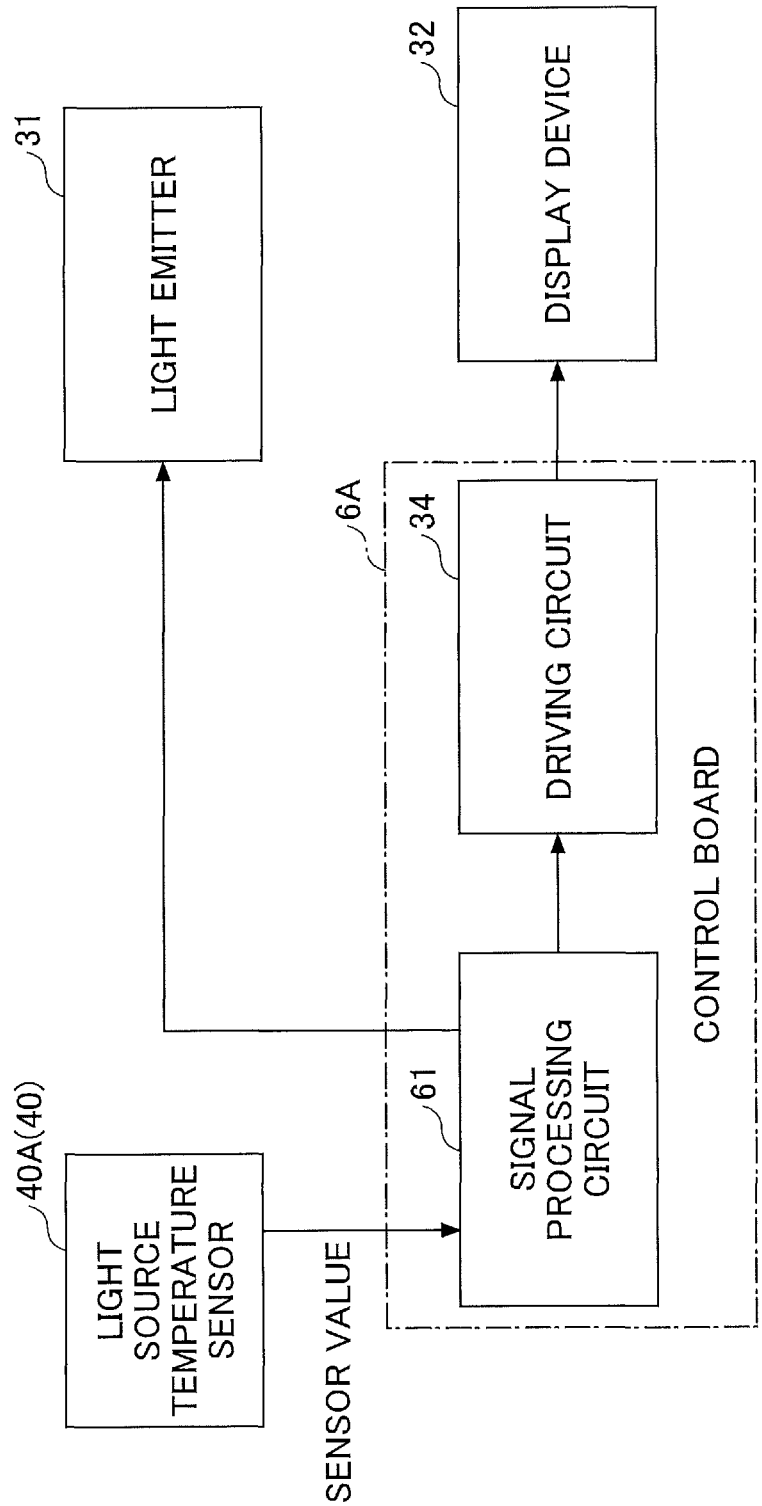
FIG. 25 is a block diagram of a second configuration of projection image output control.

FIG. 25 is a block diagram of a second configuration of projection image output control. In the second configuration, as in the first configuration, as the sensor 40, a temperature sensor 40A to measure the temperature of the emitter 31 is used.

In the second configuration, unlike the first configuration, the signal processing circuit 61 controls the emitter 31 itself instead of the display device 32. In the second configuration, the signal processing circuit 61 reduces the amount of light emitted by the emitter 31 to reduce the heat generated by the emitter 31, in the case where the temperature of the emitter 31 becomes higher than or equal to a predetermined value. This makes the temperature of the emitter 31 lower than the predetermined value, and thereby, it is possible to reduce the degradation of the emitter 31 due to the high temperature and the accompanying change over time in the emission spectrum. Also, compared to the first configuration, the change over time in hues of projection images can be suppressed.

Figure 26:
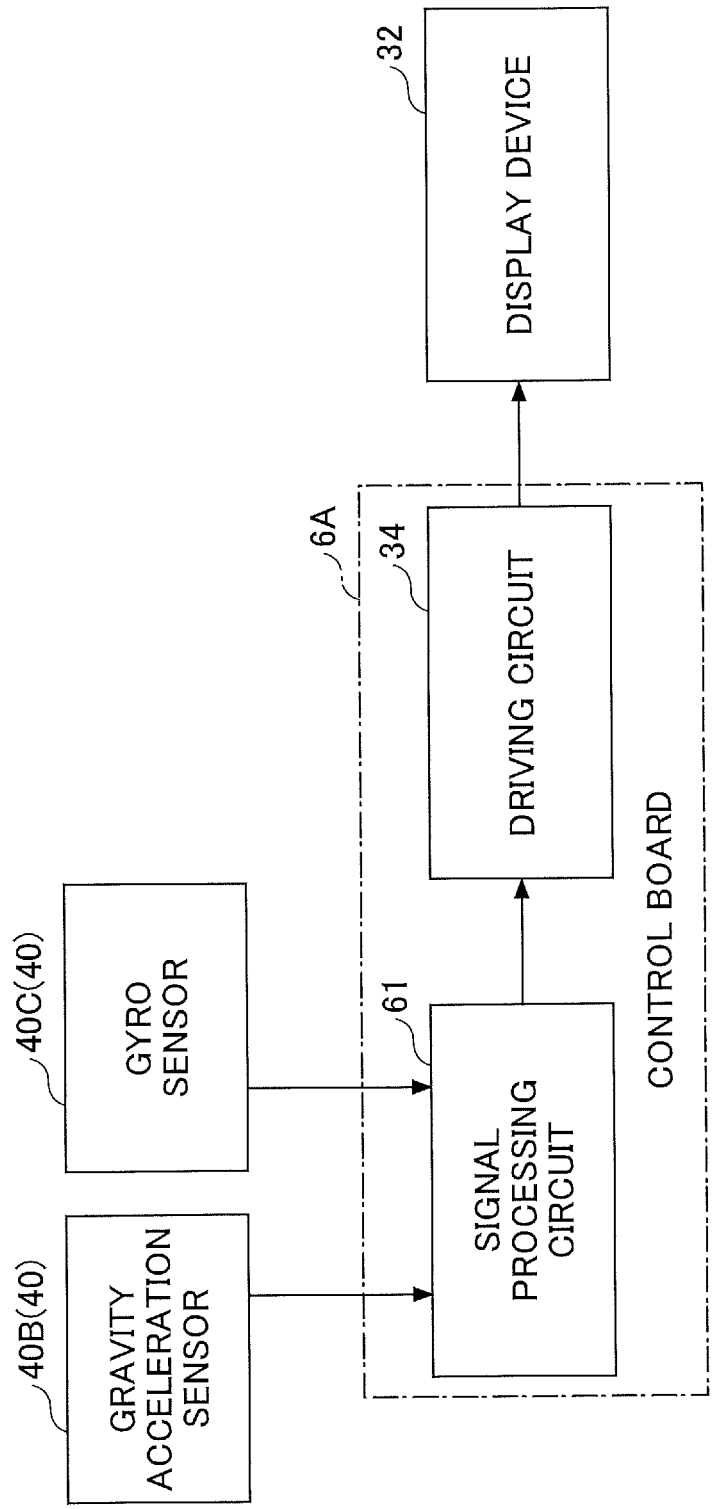
FIG. 26 is a block diagram of a third configuration of projection image output control.

FIG. 26 is a block diagram of a third configuration of projection image output control. In the third configuration, a gravity acceleration sensor 40B and a gyro sensor 40C are used as the sensor 40. In the third configuration, as the information on the state of the IP Device 1B, the position of the image projection device 1B is detected. Also, in the third configuration, a projection image output by the projector 3 is controlled so as to correct the trapezoidal distortion of the projection image (trapezoidal distortion correction process).

The gravity direction can be identified by using the gravity acceleration sensor 40B; therefore, the position of the image projection device 1B with respect to the projection plane can be identified based on the information. In the third configuration, based on the positional information, the trapezoidal distortion correction processing of an projection image can be executed by the signal processing circuit 61 that receives the display video signal as input. However, the gravitational acceleration sensor 40B becomes incapable of detecting the gravity direction when vibration occurs.

Here, in the third configuration, the gyro sensor 40C capable of measuring the angular velocity is installed so as to be capable of continuing position estimation under vibrating circumstances, by temporarily using information on the angular velocity of the gyro sensor 40C.

When the switch 4 of the image projection device 1B is manually turned on and off, vibration occurs; therefore, it is important to be capable of continuing trapezoidal distortion correction even under vibrating circumstances.

Figure 27:
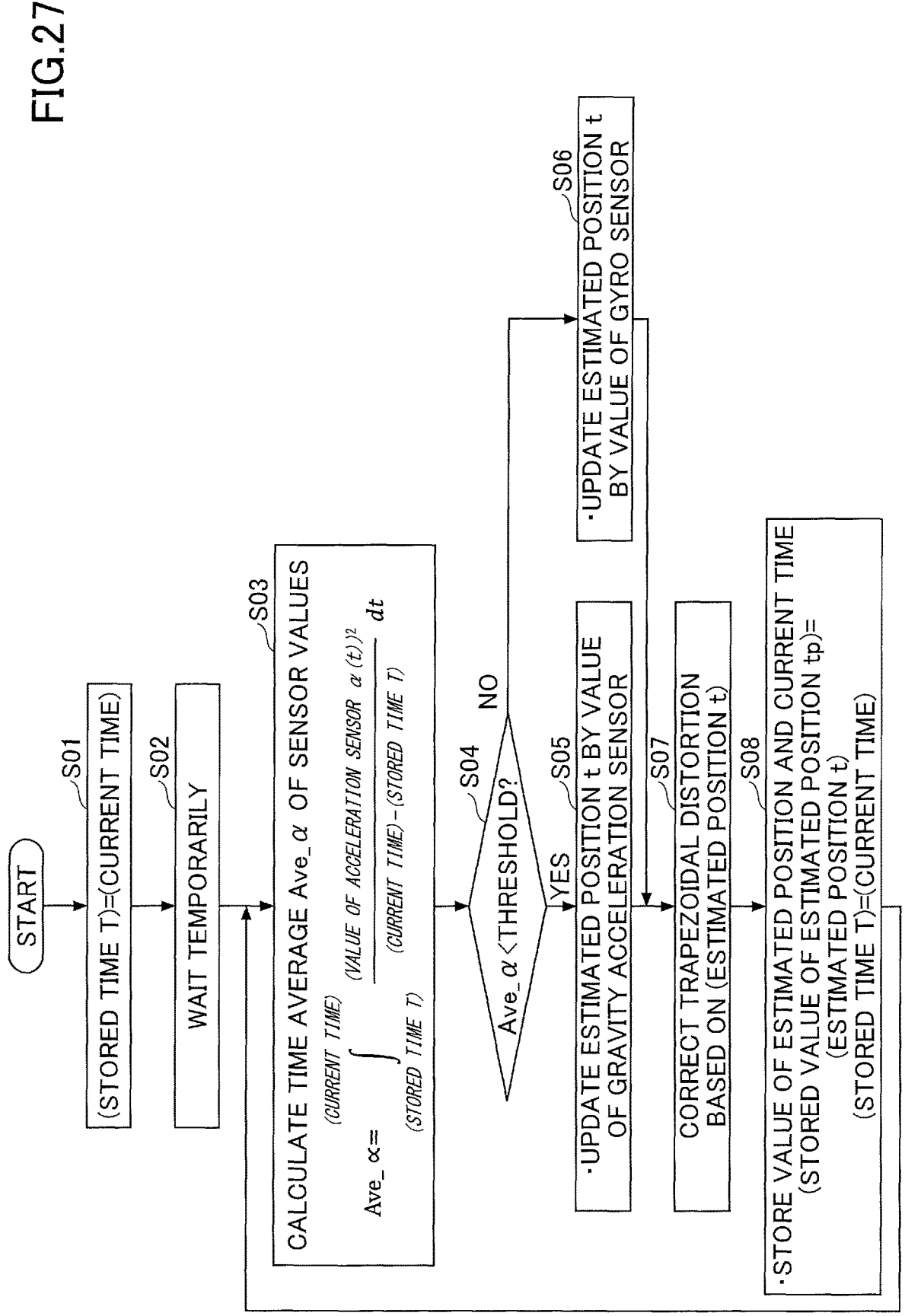
FIG. 27 is a flow chart of trapezoidal distortion correction processing.

FIG. 27 is a flow chart of trapezoidal distortion correction processing. Each process in the flow chart in FIG. 27 is executed by the signal processing circuit 61.

At Step S01, the current time is set as the stored time T, and at Step S02, the flow wait for a certain period of time. During this waiting period, namely, a period from the stored time T to the latest current time after a certain period of time has elapsed, time series data of the sensor value α(t) of the gravitational acceleration sensor 40B is recorded.

At Step S03, a time average Ave_α of the square value of the sensor value α(t) of the gravitational acceleration sensor 40B is calculated during the period from the stored time T to the latest current time after the certain period of time has elapsed. For example, by using the following Formula (1), it is possible to calculate the time average Ave_α of the gravitational acceleration sensor 40B.

[Formula 1]

$$\text{Ave}\_\alpha = \int_{(\text{STORED TIME } T)}^{(\text{CURRENT TIME})} \frac{(\text{VALUE OF ACCELERATION SENSOR } \alpha(t))^2}{(\text{CURRENT TIME}) - (\text{STORED TIME } T)} dt \quad (1)$$

At Step S04, it is determined whether the time average Ave_α of the gravitational acceleration sensor 40B is less than a predetermined threshold value. Therefore, it is possible to determine whether vibration is occurring in the image projection device 1B.

If the time average of the gravitational acceleration sensor 40B is less than the threshold value of Ave_α (YES at Step S04), it is determined at Step S05 that vibration is not occurring, and the estimated position is updated with the gravitational acceleration sensor value. In other words, a gravity direction tg indicated by the gravitational acceleration sensor 40B is used as the estimated position value t, which is expressed as the following Formula (2).

estimated position t=(gravity direction tg indicated by the gravitational acceleration sensor 40B) (2)

On the other hand, if the time average value Ave_α of the gravitational acceleration sensor 40B is greater than or equal to the threshold value (NO at Step S04), it is determined at Step S06 that vibration is occurring, and the gravitational acceleration sensor 40B may not indicate the correct gravity direction; and the estimated position t is updated with the value of the gyro sensor. In other words, the position is estimated by the angular velocity value output by the gyro sensor 40C. More specifically, the estimated position t is calculated by the following Formula (3).

estimated position t=recorded value of the estimated position tp+(change in position tw per unit time obtained from the angular velocity indicated by the gyro sensor)×((current time)−(stored time T) (3)

At Step S07, the trapezoidal distortion of the projection image is corrected based on the estimated position value t updated at Step S05 or S06.

At Step S08, the estimated position value t is stored as the recorded value of estimated position tp, and the current time are stored as the stored time T. When the processing at Step S08 is completed, the process returns to Step S03.

In this way, by updating with the sensor value of the gyro sensor 40C, the trapezoidal distortion correction based on the position estimation can be continued under vibrating circumstances.

Note that the third configuration illustrated in FIGS. 26 and 27 may be configured to use only one of the gravitational acceleration sensor 40B and the gyro sensor 40C, or to replace the gravity acceleration sensor 40B and the gyro sensor 40C with a detection unit other than these sensors, which can detect the position of the image projection device 1B.

Also, in a configuration in which the gyro sensor 40C is used as the position detecting device, the gyro sensor 40C includes a physical rotor; therefore, it may be configured to cancel the position change of the image projection device 1B by the gyro effect of this rotor. This configuration can stabilize the projection direction of the projector 3, and a more stable trapezoidal distortion correction can be performed.

Also, in a configuration in which the gyro sensor 40C is used as the position detecting device, and a projection image output by the projector 3 is projected by clipping only a partial region of an input image region, the partial region to be projected may be selected based on the value of the gyro sensor 40C. Thereby, when the position of the image projection device 1B is changed, by shifting the region to be displayed in the input image accordingly, it is possible to obtain the image stabilization effect.

Also, it may be configured to perform the hue change suppressing process illustrated in FIGS. 24 and 25, together with the trapezoidal distortion correction process illustrated in FIGS. 26 and 27. In other words, the temperature sensor 40A, and the gravitational acceleration sensor 40B and the gyro sensor 40C for detecting the position are provided. With this configuration, it is possible to perform the trapezoidal distortion correction of a projection image under vibrating circumstances, and to stabilize hues of projection images all the time.

Note that although the image projection device 1B of the third embodiment is exemplified as a device that has the same appearance as the image projection device 1A of the second embodiment, the configuration of the third embodiment can be applied to the image projection device 1 of the first embodiment.

Fourth Embodiment

With reference to FIGS. 28 to 31, a fourth embodiment will be described.

An image projection device 10 according to the fourth embodiment includes a wired input receiver compliant with, for example, HDMI or VGA, and a wireless input receiver compliant with, for example, Wi-Fi(registered trademark), Bluetooth (registered trademark), or a protocol through the Internet, as components into which video input signals are input. In the image projection device 1C according to the fourth embodiment, when a video input signal is received as input to the wired input receiver or the wireless input receiver, depending on the priority, the projection image to be automatically output from the projector is switched between an image of a video signal input from the wired input receiver, and an image of a video signal input from the wireless input receiver.

The wired input receiver is one or more connectors 13 as illustrated, for example, in FIG. 17. In the case of a wired connection, information is input through the connector(s) 13 arranged in the opening 2E of the main body 2. The wireless input receiver is installed, for example, on the control board 6 illustrated in FIGS. 18-19 and 21-22. The switching process of the projection image is performed by, for example, the control board 6 illustrated in FIGS. 18-19 and 21-22.

Figure 28:
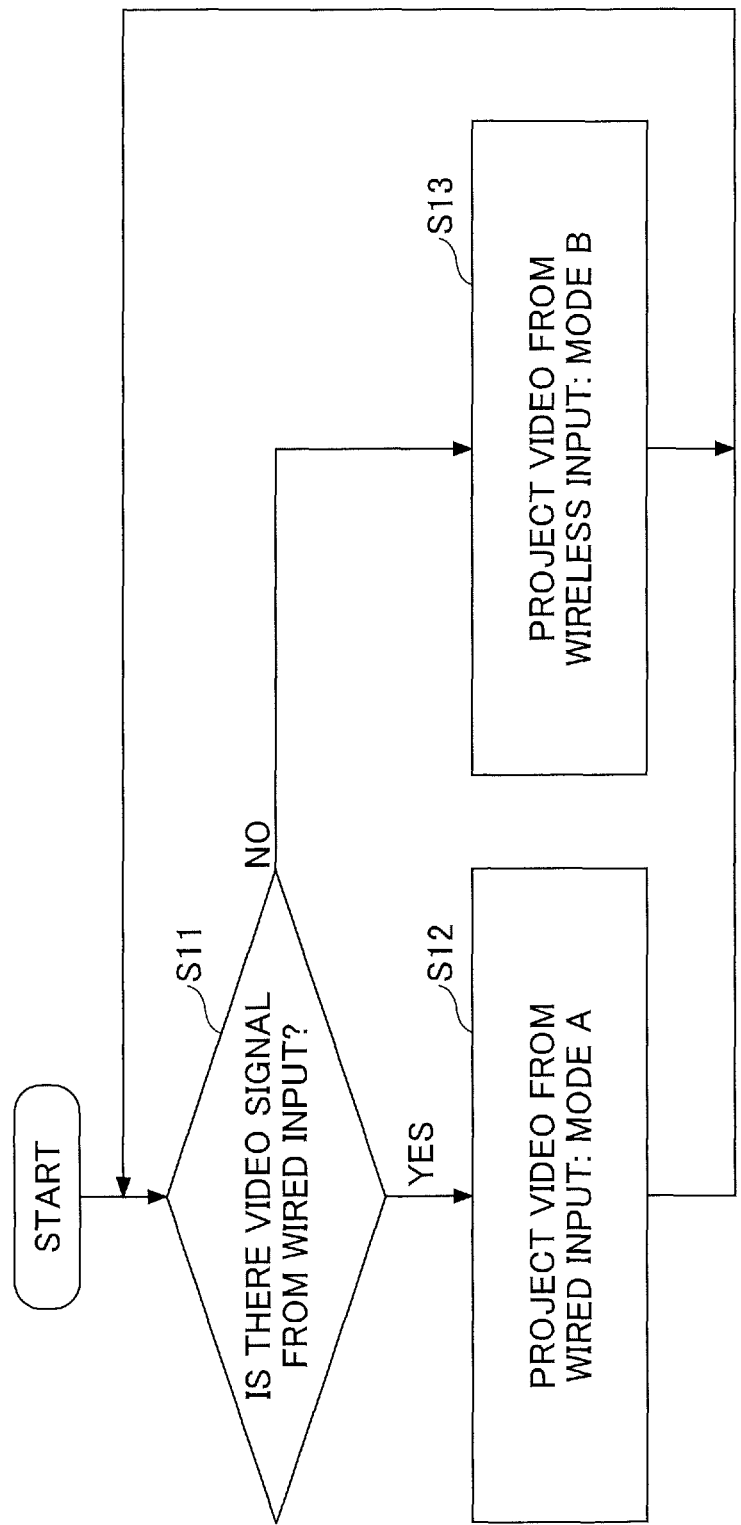
FIG. 28 is a switching flow of video input signals in a fourth embodiment.

FIG. 28 is a switching flow of video input signals in the fourth embodiment. A process according to the flow chart in FIG. 28 is executed by, for example, the control board 6. Also, in the example in FIG. 28, a wired connection is assumed as the priority setting.

At Step S11, it is determined whether a wired input receiver has a cable, connector, or the like connected from the outside, and whether there is a video input on a wired connection. Based on the determination, if there is a video input on a wired connection (YES at Step S11), at Step S12, projection is started immediately based on the video signal. In other words, the video from the wired input is projected (mode A).

Meanwhile, if there is no video signal on any wired connection (NO at Step S11), at Step S13, the video from the wireless input is projected (mode B).

In addition, by repeating the process in FIG. 28 at regular intervals, when input to the wired connection is detected, the video on the wired connection is projected without an operation of the operator of the image projection device 10 to switch the setting of input signals used for projecting images; and also in the case of using the wireless connection, a video from the wireless input can be projected without an operation of the operator of the image projection device 1C to switch the setting of input signals (by not setting the wired connection).

In this way, in the example in FIG. 28, in the case where a wired connection is established and there is a video signal from the wired input, a video from the wired input is automatically projected. In other words, the presence or absence of a wired input triggers switching between video display of the wired input and video display of the wireless input.

Note that in the example in FIG. 28, although the wired connection is assumed as the priority setting, the wireless connection may be set as the priority setting, or it may be configured to allow the operator of the image projection device 10 to set the priority setting.

Figure 29:
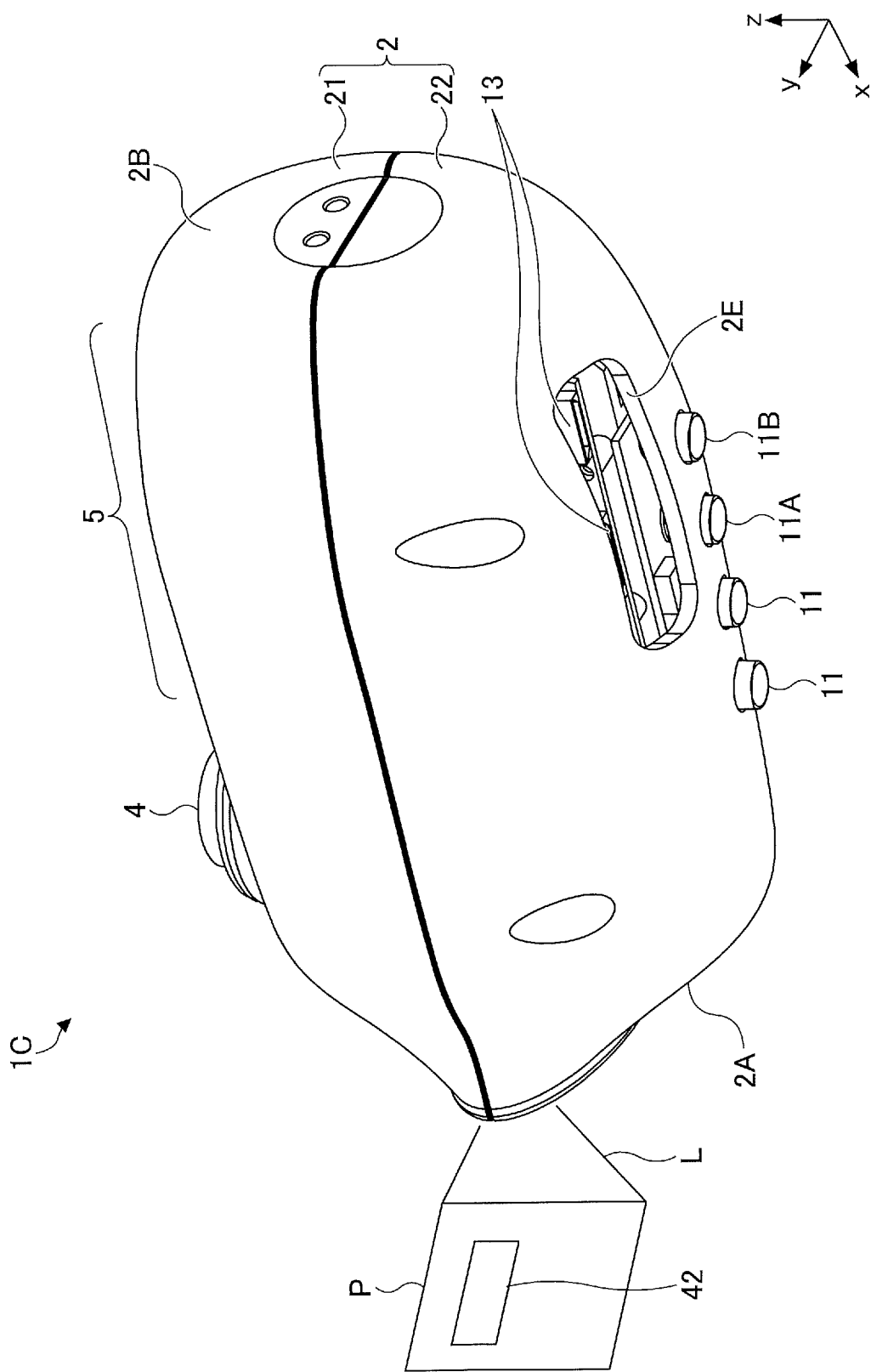
FIG. 29 is a diagram illustrating an example of a display mode of a priority setting screen.
Figure 30:
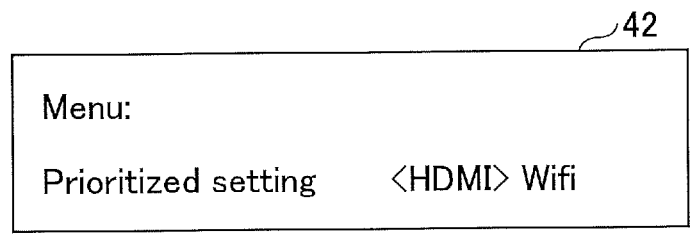
FIG. 30 is a diagram illustrating a first example of a priority setting screen.
Figure 31:
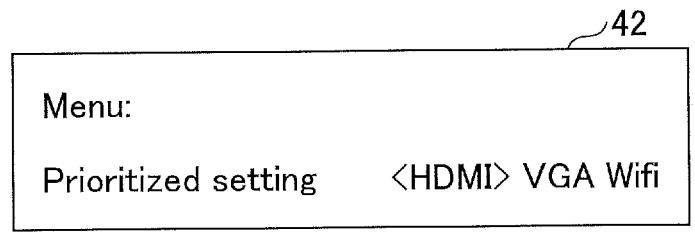
FIG. 31 is a diagram illustrating a second example of a priority setting screen.

With reference to FIGS. 29 to 31, a configuration that allows the operator of the image projection device 10 to set the priority will be described further. FIG. 29 is a diagram illustrating an example of a display mode of a priority setting screen 42.

As illustrated in FIG. 29, in the image projection device 10 according to the fourth embodiment, the operator of the image projection device 10 can perform the priority setting of the input receivers through the priority setting screen 42. The priority setting screen 42 is displayed, for example, on a projection image P projected to the outside by the projection light L emitted from the projector 3.

FIG. 30 is a diagram illustrating a first example of the priority setting screen 42. In the example in FIG. 30, on the priority setting screen 42, "HDMI" is displayed as a wired input receiver, and "Wi-Fi" is displayed as a wireless input receiver. Marks "< >" indicate the selected device; in FIG. 30, HDMI is selected.

In the present embodiment, as a group of buttons 11 provided on the main body 2 of the image projection device 1C, besides the main power button and the projection on/off button, a switching button 11A for switching whether to display the priority setting screen 42 on the projection image P, and a selector button 11B for selecting the priority setting from among input receivers are provided. As illustrated in FIG. 29, in response to the switching button 11A being pressed, the priority setting screen 42 illustrated in FIG. 30 is displayed on the projection image P; and in response to the select button 11B being pressed, the marks "< >" is moved between "HDMI" and "Wi-Fi" on the priority setting screen 42 in FIG. 30, and thereby, the input receiver to be prioritized can be switched. By providing the buttons 11A and 11B for the priority setting on the main body 2, the setting can be performed on the image projection device 1C itself, and no other device, for example, a smartphone or the like is required.

Note that in FIG. 29, although two buttons on the x-negative direction side among the group of four buttons 11 are illustrated as the switching button 11A and the selector button 11B for the priority setting, this is merely an example, and arrangement of the buttons for the priority setting is not limited as such.

The contents set on the screen in FIG. 30 are recorded on a storage device (e.g., provided in the control board 6) built in the main body 2. Therefore, the user can set the priority item when first activating the product, and thereby, it is possible to avoid cumbersome settings of sequential inputs when using it in practice.

FIG. 31 is a diagram illustrating a second example of the priority setting screen 42. In the example in FIG. 31, on the priority setting screen 42, "HDMI" and "VGA" are displayed as two wired input receivers, and "Wi-Fi" is displayed as a wireless input receiver.

In the present embodiment, as illustrated in FIG. 31, there is no distinction between wired and wireless inputs, and the input methods are displayed on the priority setting screen 42. By operating the selection button 11B similarly as in the first example illustrated in FIG. 30, the highest priority item can be set in the order of HDMI ⇒VGA ⇒Wi-Fi ⇒HDMI⇒and so on.

Also, in the present embodiment, for example, the control board 6 holds internal priorities such as HDMI>VGA>Wi-Fi. In contrast, if the highest priority item is set by the operator, that item is changed to be higher in the priority order. For example, if VGA or Wi-Fi is selected, it is moved to a higher priority location than HDMI; however, if the HDMI that has already been set to the highest priority is selected, the priority does not change.

Note that these internal priorities can be arranged in another pattern of course, and the convenience of the operator can be further improved if the operator can rank the inputs.

Also, when a wired connection is established, no display is made from the Wi-Fi input; therefore, it may be configured to automatically turn off the Wi-Fi module to perform wireless communication in the case where there is a wired video input. This configuration can eliminate the power used by the Wi-Fi module, and thereby, the battery 7 can last longer.

Also, it may be configured to allow the operator to select whether Wi-Fi is turned off or kept turned on when a wired connection is established.

Also, in the case of a configuration where the projector 3 is in the projecting state while the operator presses the switch 4, and the priority setting screen 42 is displayed on the projection image P output from the projector 3, it may be configured to automatically perform projection without pressing the switch 4 only when the priority setting screen 42 is being displayed. This configuration can cumbersome operations of pressing the buttons 11A and 11B among the group of buttons 11, for the priority setting while pressing the switch 4, and hence, the convenience is increased by allowing the operator to perform operations with one hand. Also, it may be configured to allow the operator to set on or off the automatic projection when the priority setting screen 42 is being displayed.

Also, it may be configured not to include a dedicated button for the priority setting, and to open the priority setting screen 42 by performing predetermined operations (e.g., five presses within three seconds) on the switch 4. Also, it may also be configured to trigger the switching on the priority setting screen 42 by predetermined operations (e.g., two presses within one second) on the switch 4, and/or to close the priority setting screen 42 triggered by a long press on the projection button. This configuration can reduce the number of buttons thanks to no need to have a dedicated button for the priority setting, which brings effects such as the increased convenience, eliminated complexity, better design, lower cost, and the like.

Note that although the image projection device 10 of the fourth embodiment is exemplified as a device that has the same appearance as the image projection device 1A of the second embodiment, the configuration of the fourth embodiment can be applied to the image projection device 1 of the first embodiment.

Fifth Embodiment

With reference to FIGS. 32 to 36, a fifth embodiment will be described.

An image projection device 1D according to the fifth embodiment can operate in a continuous projection mode (second mode), in addition to the momentary mode (first mode) described in the first to fourth embodiments. The momentary mode is a switching mode in which the device is in the projecting state only while the switch 4 (operation unit) is being pressed. The continuous projection mode is a mode in which the device is kept in the projecting state without a continuous operation on the switch 4 (operation unit), namely, the projecting state is maintained even in a state where the switch 4 (operation unit) is released (not pressed by the operator) without switching to the non-projecting state.

Figure 32:
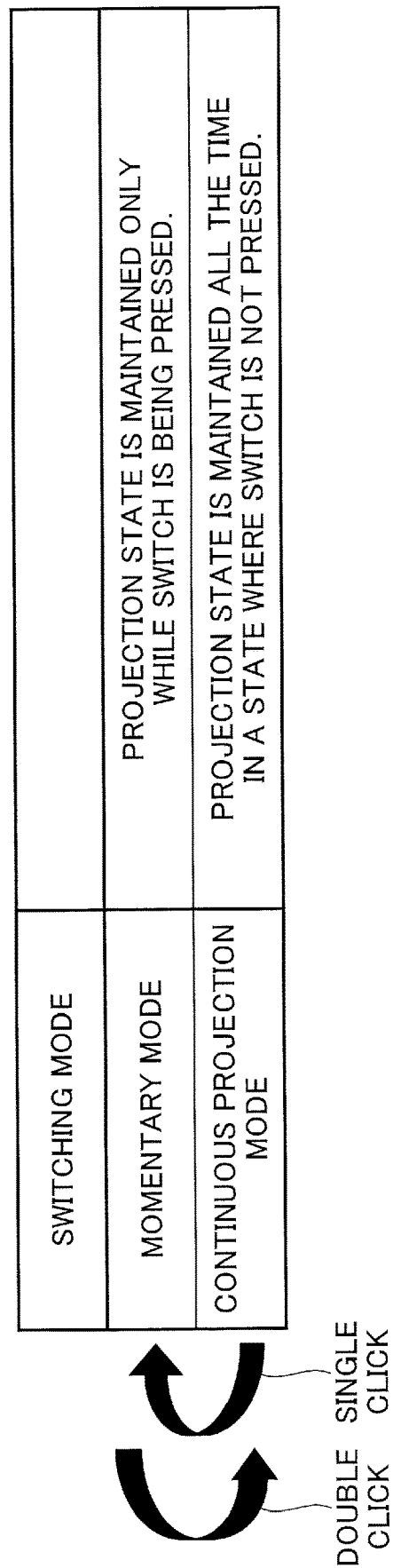
FIG. 32 is a diagram illustrating a method of switching modes in a fifth embodiment.

FIG. 32 is a diagram illustrating a method of switching modes in the fifth embodiment. As illustrated in FIG. 32, in the fifth embodiment, the two modes of the momentary mode and the continuous projection mode described above can be switched by a specific input sequence on the switch 4. Specifically, as illustrated in FIG. 32, the momentary mode is turned on in response to a single click on the switch 4, and the continuous projection mode is turned on in response to a double click on the switch 4.

In this way, by allowing execution of the two modes of the momentary mode and the continuous projection mode, for example, when the operator wishes to continue projection for a long time, by selecting the continuous projection mode, the projecting state can be maintained without continuously pressing the operation unit 4; therefore, the burden on the operator can be reduced. Also, by a configuration in which the momentary mode and the continuous projection mode are switched in response to predetermined operations on the operation unit 4, it is possible to make switching between projection and non-projection, and switching between the modes by a single switch (operation unit 4). Therefore, when the operator wishes to switch the mode while using the device, the operator can perform the mode switching more easily and quickly while holding the device.

Note that the input sequence for the mode switching is not limited to the example in FIG. 32. For example, contrary to the example in FIG. 32, it may be configured such that the momentary mode is turned on in response to a double click on the switch 4, and the continuous projection mode is turned on in response to a single click. Alternatively, it may be configured such that the momentary mode and the continuous projection mode are switched in response to a double click on the switch 4; or the momentary mode and the continuous projection mode are switched in response to a single click on the switch 4. In the following description, a configuration of switching the momentary mode and the continuous projection mode in response to a double click on the switch 4 will be described as an example.

With reference to FIG. 6, the functional blocks of the image projection device 1D according to the fifth embodiment will be described. The outline of the block diagram of the image projection device 1D according to the fifth embodiment is similar to that of the modified example of the first embodiment illustrated in FIG. 6. In the configuration illustrated in FIG. 6, the control board 6A performs switching electrically as a switching unit that switches the wire 14 connecting the control board 6A with the projector 3, between a conductive state (on state) and a non-conductive state (off state), in response to an operation input on the switch 4 as the operation unit, instead of the switching unit 18 provided on the wire 14 to perform physical switching in FIG. 5.

The control board 6A can control the projecting state and the non-projecting state of the projector 3. The control board 6A has the MCU 18A (Micro Controller Unit) built in. The MCU 18A can detect a pressed/non-pressed state of the switch 4 electrically connected to the control board 6A.

The control board 6A can measure transition in time of pressed/non-pressed states of the switch 4 by the MCU 18A, and based on the transition in time, it is possible to determine whether a double click (or single click) is performed on the switch 4. In addition, as described above, the control board 6A switches the continuous projection mode and the momentary mode each time a double click is performed on the switch 4.

Further, in the momentary mode, the control board 6A supplies power to the projector 3 through the wire 14 while the switch 4 is being pressed to be in the projecting state, based on information on the pressed/non-pressed state of the switch 4 detected by the MCU 18A.

In other words, in the image projection device 1D according to the fifth embodiment, as in the case of the modified example of the first embodiment illustrated in FIG. 6, the control board 6A functions as a switching unit to switch whether to supply power to the projector 3 in response to a pressing operation on the switch 4 (operation unit), and the control board 6A also functions as a second switching unit to switch the momentary mode and the continuous projection mode, and thus, has two switching functions.

Figure 33:
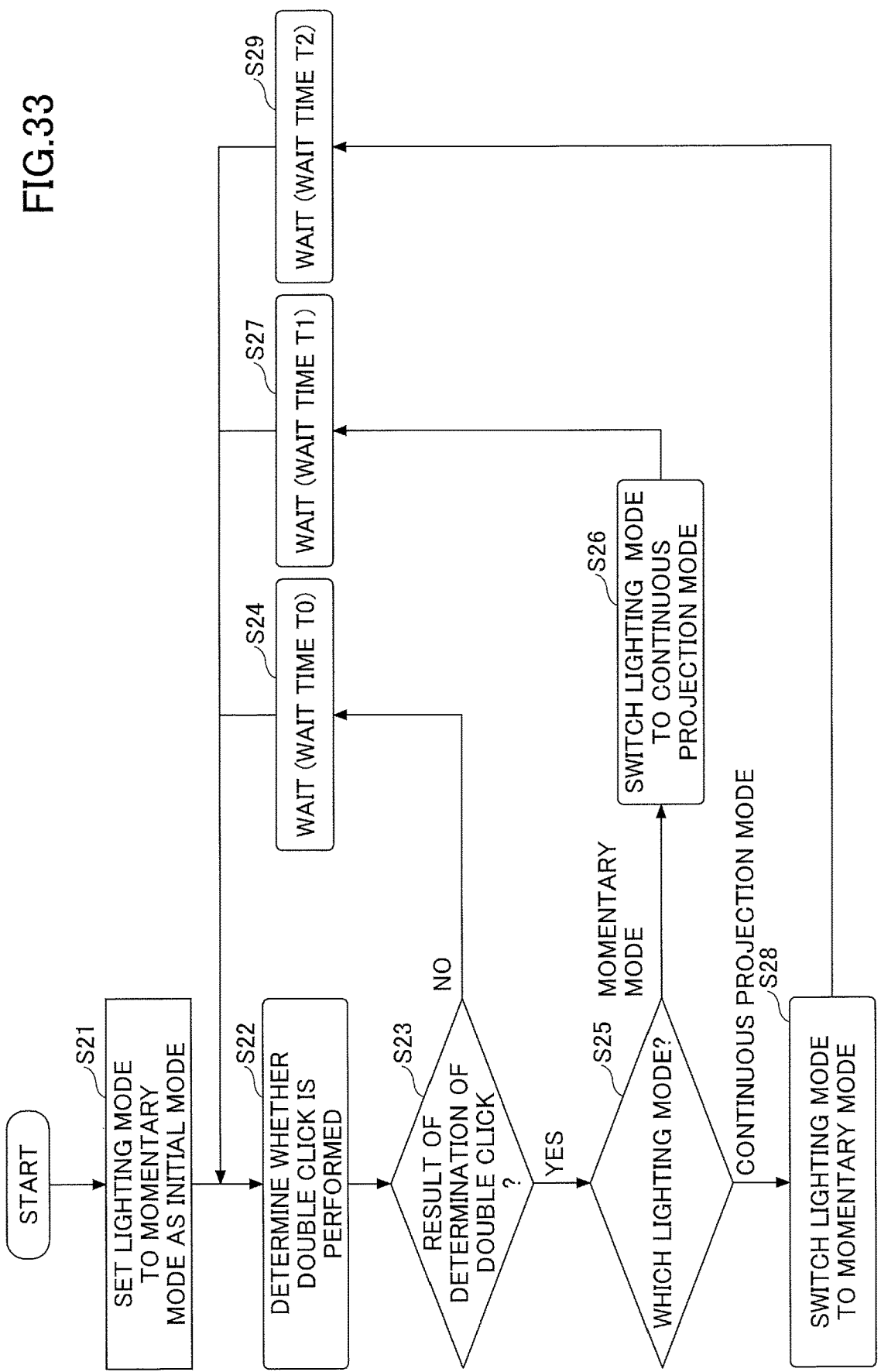
FIG. 33 is a flow chart of mode switching processing in the fifth embodiment.

FIG. 33 is a flow chart of mode switching processing in the fifth embodiment.

At Step S21, the momentary mode is set as the initial lighting mode of the image projection device 1D.

At Step S22, it is determined whether a double click is performed on the switch 4. Based on the information on transition in time of pressed/non-pressed states of the switch 4 detected by the MCU 18A, the control board 6A determines whether a double click is performed on the switch 4.

At Step S23, a result of determination whether a double click is performed is confirmed. If no double click is performed (NO at Step S23), the process proceeds to Step S24, waits for a predetermined wait time T0, and then, proceeds to the double click determination at Step S22 again.

On the other hand, if a double click is performed (YES at Step S23), the process proceeds to Step S25 to confirm the current lighting mode. If the current lighting mode is the momentary mode, the process proceeds to Step S26, to switch the lighting mode to the continuous projection mode. Subsequently, after waiting for a predetermined wait time T1 at Step S27, the process proceeds to the double click determination at Step S22.

On the other hand, if the current lighting mode is the continuous projection mode, the process proceeds to Step S28 to switch the lighting mode to the momentary mode. Subsequently, after waiting for a predetermined wait time T2 at Step S29, the process proceeds to the double click determination at Step S22.

Therefore, the user can switch multiple operation modes by the single switch 4 without using multiple switches; therefore, it is possible to provide straightforward operations for the user.

Figure 34:
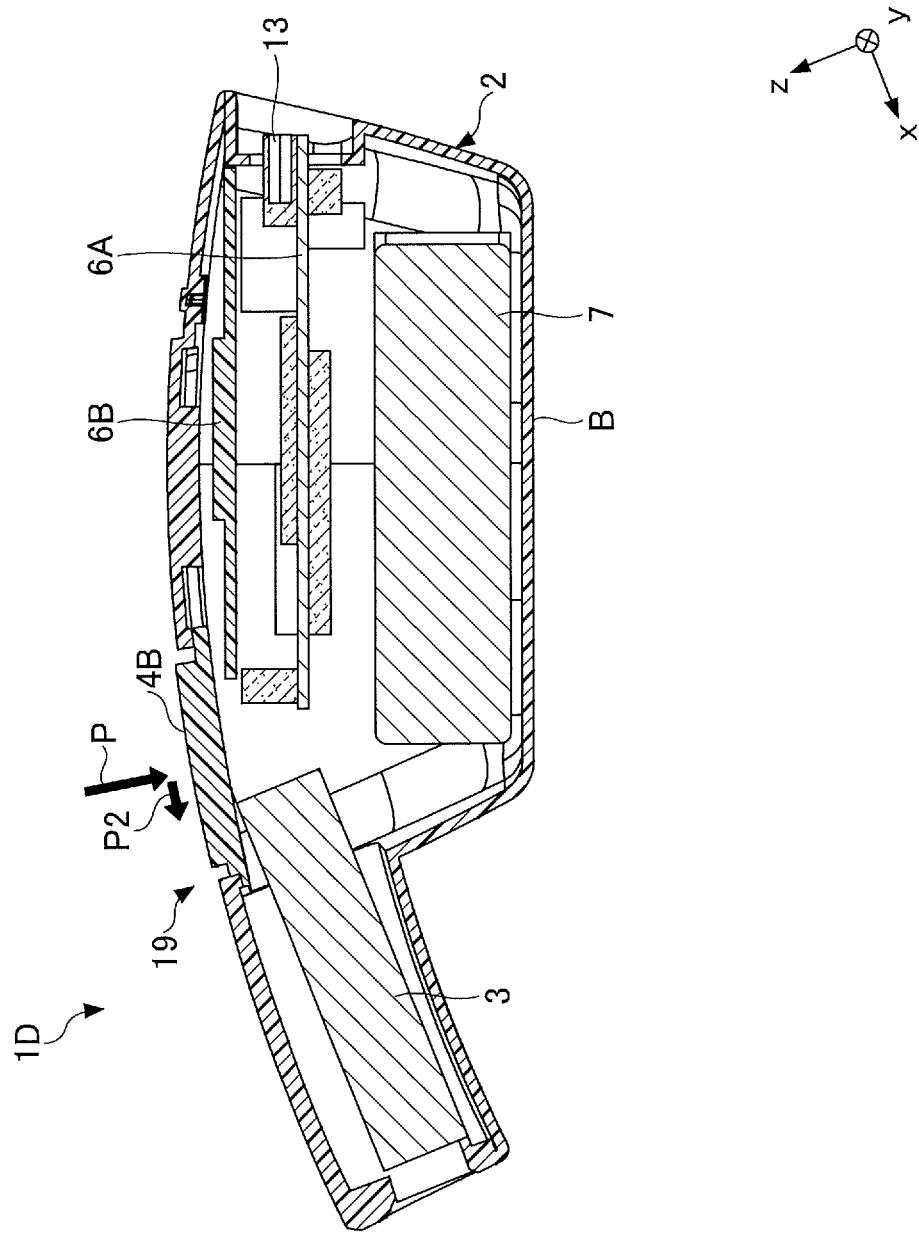
FIG. 34 is a side cross-sectional view of an image projection device according to a modified example of the fifth embodiment.
Figure 35:
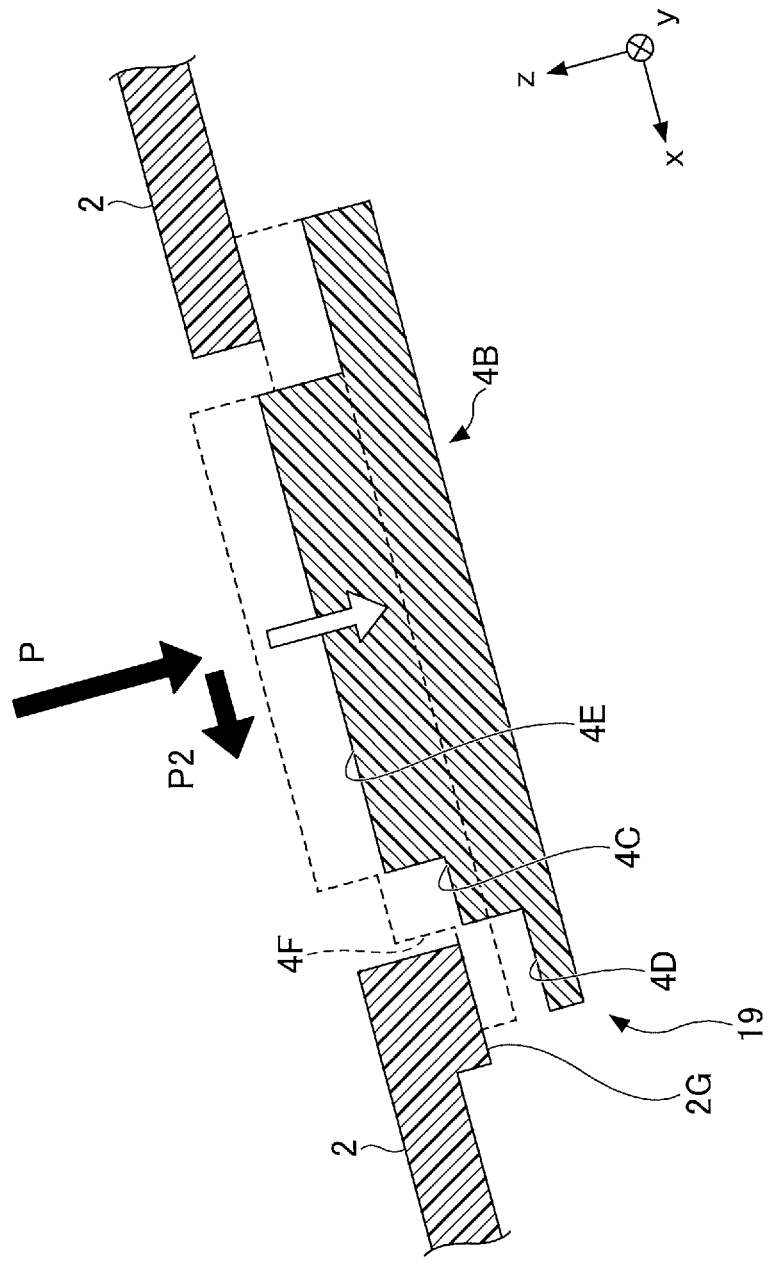
FIG. 35 is a schematic diagram illustrating a first stage of a pressing operation on a switch.
Figure 36:
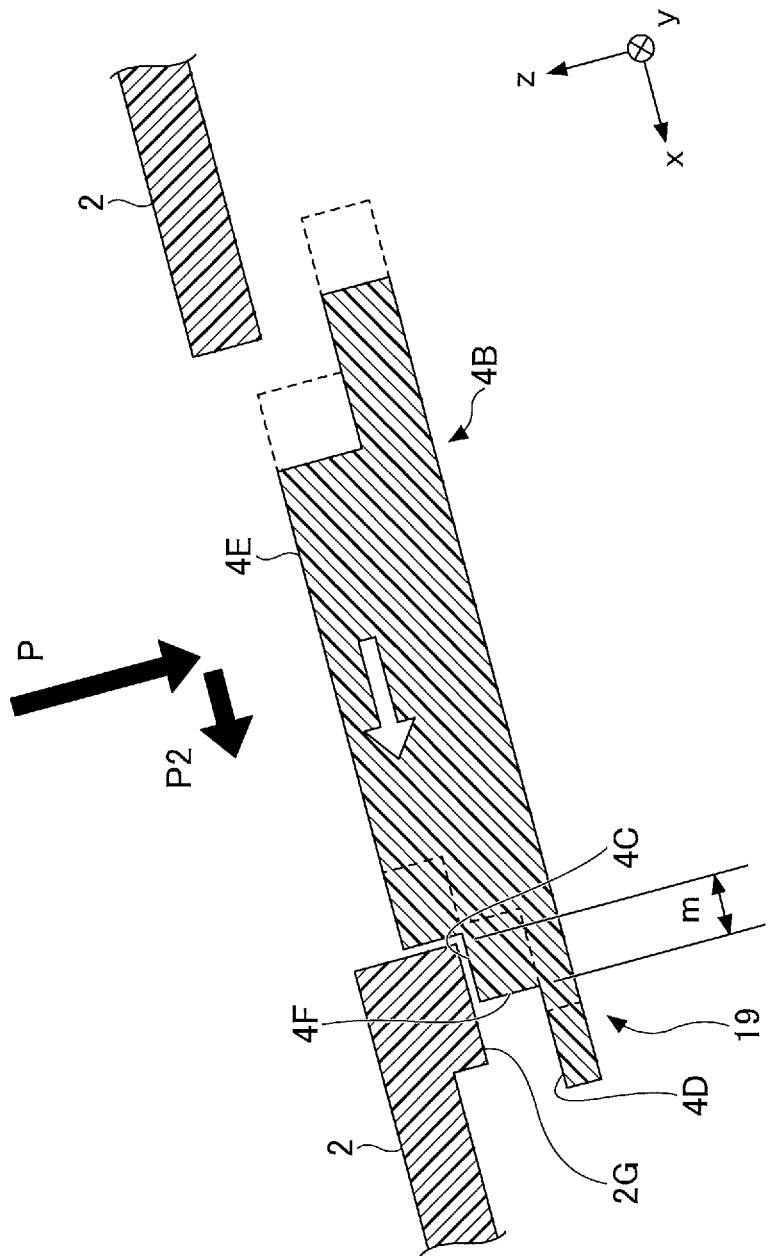
FIG. 36 is a schematic diagram illustrating a second stage of the pressing operation of the switch.

With reference to FIGS. 34 to 36, a modified example of the fifth embodiment will be described. FIG. 34 is a side cross-sectional view of an image projection device 1D according to the modified example of the fifth embodiment. FIG. 35 is a schematic diagram illustrating a first stage of a pressing operation on a switch 4B (operation unit). FIG. 36 is a schematic diagram illustrating a second stage of the pressing operation on the switch 4B.

The mode switching of the fifth embodiment can also be performed without a double click (or single click) operation on the switch 4. For example, as illustrated in FIGS. 34 to 36, it may be configured to include a hold mechanism 19 capable of holding a pressed state in which the switch 4B is being pressed, to switch to the continuous projection mode in practice. Therefore, it is possible to switch to the continuous projection mode more easily without performing a specific input operation such as a double click.

As illustrated in FIG. 34, when pressed in a direction P inward the main body 2, the switch 4B transitions to the on state to be capable of causing the projector 3 to transition to the projecting state. Further, the switch 4B is configured to be slidable in a direction P2 toward the front side of the main body 2 (e.g., a direction perpendicular to the direction P). The switch 4B has its periphery recessed inward the main body 2 (in the direction P) to form a step with respect to of an operating surface 4E on the top, and this periphery comes to face the inner wall of the main body 2. Further, part of the periphery on the front side of the main body 2 (in the direction P2) has two steps formed. The part has a first step surface 4C that is recessed one step with respect to the operating surface 4E, and a second step surface 4D that is further recessed with respect to the first step surface 4C. The second step surface 4D is arranged to be closer to the front side of the main body 2 than the first step surface 4C, and thereby, a two-staged step surface is provided from the operating surface 4E toward the front side of the main body 2. Also, on the inner wall of the main body 2, an end surface 2G facing the first step surface 4C and the second step surface 4D of the switch 4B protrudes inward (in the direction P) more than the other parts of the inner wall.

When the switch 4B is in the off state, as illustrated in dotted lines in FIGS. 34 and 35, the second step surface 4D is in a position facing the end surface 2G, and the first step surface 4C is positioned outward with respect to the end surface 2G. Therefore, the operating surface 4E is arranged so as to be flush with the outer surface of the main body 2, or to protrude outward from the outer surface. At this time, an end surface 4F connecting the first step surface 4C and the second step surface 4D is caught by the main body 2; therefore, the switch 4B is restricted so as not to be slidable toward the front side of the main body 2 (in the direction P2).

When the switch 4B is in the on state, the switch 4B is being pushed into the main body 2 in the direction P as illustrated in FIG. 35. At this time, the first step surface 4C moves to a position lower than the end surface 2G; therefore, the end surface 4F also comes to a position lower the end surface 2G, and the restriction is released, and thereby, the switch 4B becomes slidable toward the front side of the main body 2 as illustrated in FIG. 36. Consequently, part of the first step surface 4C (a rock region m) can be positioned on the lower side of the end surface 2G. If attempting to cause the switch 4B to return upward from this state, the rock region m of the first step surface 4C is blocked by the end surface 2G; therefore, the switch 4B cannot return to the off state, and the on state is maintained.

In the example in FIGS. 34 to 36, the slidable switch 4B, the first step surface 4C of the switch 4B, and the end surface 2G of the main body 2 together function as the "hold mechanism 19 to hold a pressed state of the operation unit 4".

In this way, a pressed state of the switch 4B can be maintained by the rock region m of the switch 4B; therefore, projection can be performed without continuously pressing the switch 4B. In other words, it is possible to practically switch from the momentary mode to the continuous projection mode.

Note that the modified example in FIGS. 34 to 36 can also be expressed as "a structure for switching the momentary mode and the continuous projection mode" as described above, or it can also be expressed as "a structure for holding the projecting state without continuous pressing on the switch, in an image projection device that can only perform the momentary mode as the single mode".

Also, in the fifth embodiment, the MCU 18A may be configured to be capable of detecting the pressing force on the operation unit 4B in stages. In this configuration, the control board 6A can switch the switching mode of the projector 3 between the momentary mode and the continuous projection mode, in response to the pressing force on the operation unit 4B detected by the MCU 18A. For example, it is possible to switch to the momentary mode in the case where the pressing force is relatively small, and to switch to the continuous projection mode in the case where the pressing force is relatively large.

Also, it may be configured to include both the MCU 18A and the hold mechanism 19. In this case, even after switching to the continuous projection mode (second mode) by a predetermined operation, it is possible to hold the pressed state by the holding mechanism 19.

Note that although the image projection device 1D of the fifth embodiment is exemplified as a device that has the same appearance as the image projection device 1 of the first embodiment, the configuration of the fifth embodiment can be applied to the image projection devices 1A, 1B, and 1C of the second to fourth embodiments.

As above, embodiments has been described with reference to specific examples. However, the present disclosure is not limited to these specific examples. Design changes appropriately added to these specific examples by those skilled in the art are also covered in the range of the present disclosure as long as the features in the present disclosure are provided. The elements, arrangements, conditions, shapes, and the like of the respective specific examples described above are not limited to those exemplified, and can be modified appropriately. The elements of the respective specific examples described above may be combined differently as appropriate, as long as no technical inconsistency is introduced.

In the above embodiments, although the configurations in which the switch 4 is a push-button switch have been exemplified, other types of switches may be used as long as the switch can be turned on and off in response to operation inputs. For example, a touch switch using a touch sensor or the like may be used. Also, in the above embodiments, although the switch for momentary operations has been exemplified, a switch for alternate operations, i.e., a switch having a structure that turns on when pushed once, holds the on state even after the hand is released, and turns off when pushed once more.

Also, in the above embodiments, although a configuration is exemplified in which both the emitter 31 and the DLP 32 of the projector 3 are stopped together when the switch 4 is in the off state, as long as being capable of switching the projecting state and the non-projecting state at least, it may be configured to stop only one of the emitter 31 or the DLP 32.

The following Note 1 to Note 38 are added to the above description:

1. An image projection device comprising:
a projector configured to project an image; and
an operation unit configured to receive an operation performed by an operator,
wherein the projector is in a projecting state while the operation unit is receiving a pressing operation performed by the operator, and wherein the projector is in a non-projecting state while the operation unit is not receiving a pressing operation performed by the operator.

2. The image projection device as described in Note 1, wherein in response to a predetermined operation on the operation unit, switching is performed between a first mode in which the projector is in the projecting state while the operation unit is receiving a pressing operation performed by the operator, and the projector is in the non-projecting state while the operation unit is not receiving a pressing operation performed by the operator; and a second mode in which the projecting state of the projector is maintained while the operation unit is not receiving a pressing operation.

3. The image projection device as described in Note 2, wherein the predetermined operation includes a double click and a single click of the operation unit.

4. The image projection device as described in any one of Notes 1 to 3, further comprising:

a hold mechanism configured to hold a pressed state as a state in which the operation unit is being pressed, wherein while the pressed state of the operation unit is being held by the hold mechanism, the projecting state of the projector is maintained even while the operation unit is not being pressed by the operator.

5. The image projection device as described in any one of Notes 1 to 4, wherein the projector includes an emitter, and the emitter is switched to be turned on and off in response to a pressing operation on the operation unit.

6. The image projection device as described in any one of Notes 1 to 5, wherein the projector includes an emitter and an image forming unit configured to form a projection image through light output from the emitter, and wherein an operational state and a stop state of the image forming unit are switched in response to a pressing operation on the operation unit.

7. The image projection device as described in any one of Notes 1 to 6, further comprising:

a controller configured to control an operation of the projector; and a switching unit configured to switch whether to supply power from the controller to the projector in response to a pressing operation on the operation unit.

8. The image projection device as described in Note 7, wherein the switching unit is installed on a wire that supplies power from the controller to the projector, to switch the wire between a conductive state and a non-conductive state in response to a pressing operation on the operation unit.

9. The image projection device as described in Note 7, wherein the switching unit controls switching whether to supply power to the projector by the controller in response to a pressing operation on the operation unit.

10. The image projection device as described in any one of Notes 1 to 6, further comprising:

a controller configured to control an operation of the projector, wherein the controller is capable of executing a first mode in which the projector is in the projecting state while the operation unit is receiving a pressing operation performed by the operator, and the projector is in the non-projecting state while the operation unit is not receiving a pressing operation performed by the operator; and a second mode wherein the projector is kept in the projecting state without a continuous operation on the operation unit, and wherein the controller is capable of detecting pressing force applied to the operation unit in stages, and switches the first mode and the second mode according to the pressing force.

11. The image projection device as described in any one of Notes 1 to 10, wherein the main body housing the projector is formed in a shape that can be held by one hand.

12. The image projection device as described in Note 11, wherein the main body is formed to have a dimension of the projector along an up-and-down direction of the projection image smaller than a dimension along a left-and-right direction of the projection image, and wherein the operating unit is arranged in an upper part on a surface of the main body, corresponding to an upper side of the projection image.

13. The image projection device as described in Note 11 or 12, wherein the main body is formed to have a wide rectangular cross-sectional shape viewed in a projection direction of the projector.

14. The image projection device as described in any one of Notes 11 to 13, further comprising:

a convex part protruding from the main body in a projection direction of the projector, wherein the projector is installed in the convex part.

15. The image projection device as described in Note 14, wherein the convex part is arranged to have its upper surface be flush with the upper surface of the main body.

16. The image projection device as described in Note 14 or 15, wherein the convex part is formed to have a wide rectangular cross-sectional shape viewed in the projection direction, formed to be smaller than a rectangular shape of the main body, and arranged to be closer to a center in a left-and-right width direction.

17. The image projection device as described in Note 11, wherein the main body is formed to have a dimension of the projector along an up-and-down direction of the projection image greater than a dimension along a left-and-right direction of the projection image, and wherein the operating unit is arranged in an upper part on a surface of the main body, corresponding to an upper side of the projection image.

18. The image projection device as described in any one of Notes 1 to 17, further comprising:

a detection unit configured to detect a state of the image projection device, wherein the controller controlling the operation of the projector controls a projection image output by the projector based on the state detected by the detection unit.

19. The image projection device as described in Note 18, wherein the detection unit is a temperature sensor installed in an interior of or on a surface of the main body housing the projector.

20. The image projection device as described in Note 19, wherein the temperature sensor reads a temperature of a light source of the projector, and wherein the controller controls hues of the projection image depending on a sensor value detected by the temperature sensor.

21. The image projection device as described in Note 19, wherein the temperature sensor reads a temperature of a light source of the projector, and wherein the controller reduces an amount of light in response to the temperature of the light source detected by the temperature sensor becoming greater than or equal to a predetermined value.

22. The image projection device as described in any one of Notes 18 to 21, wherein the detection unit is a sensor installed on a surface or in an interior of the main body housing the projector, and configured to detect a position of the image projection device.

23. The image projection device as described in Note 22, wherein the sensor configured to detect the position includes a gravitational acceleration sensor, 24. The image projection device as described in Note 22 or 23, wherein the sensor configured to detect the position includes a gyro sensor, 25. The image projection device as described in any one of Notes 22 to 24, wherein the controller corrects trapezoidal distortion of the projection image depending on the position of the image projection device detected by the sensor detecting the position.

26. The image projection device as described in Note 22, wherein the sensor configured to detect the position includes a gravitational acceleration sensor and a gyro sensor, wherein the controller determines whether the image projection device is under vibrating circumstances, performs, based on a result of the determination of the vibrating circumstances, position estimation by switching between position estimation by the gravity acceleration sensor, and position estimation by a value of the gyro sensor, and corrects trapezoidal distortion of the projection image based on a result of the position estimation.

27. The image projection device as described in Note 26, wherein the controller obtains a time average value of a square of a sensor value of the gravitational acceleration sensor, to determine whether the image projection device is in the vibrating circumstances base on the time average value.

28. The image projection device as described in Note 26 or 27, wherein upon determining that the image projection device is in the vibrating circumstances, the controller performs the position estimation using the value of the gyro sensor.

29. The image projection device as described in any one of Notes 22 to 28, wherein the sensor configured to detect the position includes a gyro sensor, wherein the gyro sensor has a physical rotor, and wherein the position of the device is controlled to cancel a position change by a gyro effect of the rotor.

30. The image projection device as described in any one of Notes 22 to 29, wherein the sensor configured to detect the position includes a gyro sensor, wherein the projection image is projected by clipping only a partial region of an input image, and wherein the partial region to be projected is selected based on a value of the gyro sensor.

31. The image projection device as described in any one of Notes 18 to 30, wherein the detection unit is detachable from and attachable to the main body housing the projector.

32. The image projection device as described in any one of Notes 1 to 31, further comprising:

a wired input receiver configured to receive as input a video by wire; and a wireless input receiver configured to receive as input a video by radio, wherein the controller controlling the operation of the projector sets a priority to each of the wired input receiver and the wireless input receiver, and in response to receiving as input a video signal into an input receiver having a higher priority, does not determine whether a video signal is input into an input receiver having a lower priority, and causes the projector to project the video signal input into the input receiver having the higher priority.

33. The image projection device as described in Note 32, wherein the priority can be set by the operator of the image projection device.

34. The image projection device as described in Note 33, wherein the main body housing the projector is provided with a button for the operator to perform an operation to set the priority.

35. The image projection device as described in Note 34, wherein the projector is in the projecting state while the operator is pressing the operation unit, wherein a priority setting screen for the operator to set the priority is displayed on the projection image output by the projector, and wherein while the priority setting screen is open, projection is performed without a pressing operation on the operation unit.

36. The image projection device as described in Note 33, wherein the setting operation of the priority is performed in response to operations performed in a specific sequence on the operation unit.

37. The image projection device as described in any one of Notes 32 to 36, wherein a module for wireless communication is stopped while operating with wired input.

38. The image projection device as described in Note 37, wherein the operator of the image projection device is allowed to set whether to stop the module for wireless communication while operating with wired input.

The following Additional Note 1 to Additional Note 21 are further added to the above description:

1. An image projection device comprising:
a projector configured to project an image by emitting light to an outside;
a main body housing a projector; and
an operation unit arranged on a surface of the main body,
wherein the operation unit is installed so as to make an angle formed between a direction of a center of an optical axis of the light, and a pressing direction of the operation unit, not be equivalent to 90 degrees.

2. The image projection device as described in Additional Note 1, wherein the operation unit is installed to make an angle formed between a direction of a center of an optical axis of the projector, and the pressing direction of the operation unit, be an obtuse angle.

3. The image projection device as described in Additional Note 1 or 2, wherein the projector has a convex part protruding from the main body on a side where the image is projected, and wherein the projector is arranged in an interior of the convex part.

4. The image projection device as described in any one of Additional Notes 1 to 3, wherein the projector is arranged higher than the controller that is housed in the main body to control an operation of the projector, in a case where the direction of the center of the optical axis corresponds to a horizontal direction.

5. The image projection device as described in any one of Additional Notes 1 to 4, wherein in a case of placing the main body on a plane, a projection direction of the projector is directed downward with respect to a horizontal direction.

6. The image projection device as described in any one of Additional Notes 1 to 5, wherein in a case of placing the main body on a plane, the operation unit is arranged such that a part or entirety of a vertical projection of the operation unit on the plane comes outside of a bottom surface of the main body.

7. The image projection device as described in any one of Additional Notes 1 to 6, wherein a partition is provided between the projector housed in the interior of the main body, and the controller housed in the interior of the main body to control the operation of the projector.

8. The image projection device as described in any one of Additional Notes 1 to 7, wherein a hole is provided in a front end on the projection side of a convex part formed to protrude from the main body on a side where the projector projects the image.

9. The image projection device as described in Additional Note 7, wherein a hole is provided in a region on the projector side among regions of the main body sectioned by the partition.

10. The image projection device as described in any one of Additional Notes 1 to 9, wherein a cooling fan is provided in an interior of the main body.

11. The image projection device as described in any one of Additional Notes 1 to 10, wherein a part or entirety of the main body is formed of a heat-conductive resin.

12. The image projection device as described in any one of Additional Notes 1 to 11, wherein a part or entirety of the main body is formed of metal.

13. The image projection device as described in any one of Additional Notes 1 to 12, further comprising:
a controller configured to control an operation of the projector,
wherein the operation unit switches the projector between a projecting state and a non-projecting state in response to an operation input while maintaining an activated state of the controller,
wherein the emitter is switched to be turned on and off, in response to an operation input on the operation unit, and
wherein the main body is formed in a shape that can be held by one hand.

14. The image projection device as described in any one of Additional Notes 1 to 13, further comprising:
a controller configured to control an operation of the projector,
wherein the projector is in a projecting state while the operation unit is being pressed by an operator, and
wherein the projector is in a non-projecting state while the operation unit is not being pressed by the operator.

15. The image projection device as described in Additional Note 14, wherein in response to a predetermined operation on the operation unit, switching is performed between
a first mode wherein the projector is in the projecting state while the operation unit is receiving a pressing operation performed by the operator, and the projector is in the non-projecting state while the operation unit is not receiving a pressing operation performed by the operator, and
a second mode for maintaining the projecting state of the projector even when the operation unit is receiving a pressing operation.

16. The image projection device as described in Additional Note 15, wherein the predetermined operation includes a double click and a single click of the operation unit.

17. The image projection device as described in any one of Additional Notes 14 to 16, further comprising:
a hold mechanism configured to hold a pressed state as a state in which the operation unit is being pressed,
wherein while the pressed state of the operation unit is being held by the hold mechanism, the projecting state of the projector is maintained even while the operation unit is not being pressed by the operator.

18. The image projection device as described in any one of Additional Notes 14 to 17, further comprising:

a switching unit configured to switch whether to supply power from the controller to the projector in response to a pressing operation on the operation unit.

19. The image projection device as described in Additional Note 18, wherein the switching unit is installed on a wire that supplies power from the controller to the projector, to switch the wire between a conductive state and a non-conductive state in response to a pressing operation on the operation unit.

20. The image projection device as described in Additional Note 18, wherein the switching unit controls switching whether to supply power to the projector by the controller in response to the pressing operation on the operation unit.

21. The image projection device as described in any one of Additional Notes 14 to 17, wherein the controller is capable of executing
a first mode in which the projector is in the projecting state while the operation unit is receiving a pressing operation performed by the operator, and the projector is in the non-projecting state while the operation unit is not receiving a pressing operation performed by the operator; and
a second mode wherein the projector is kept in the projecting state without a continuous operation on the operation unit, and
wherein the controller is capable of detecting pressing force applied to the operation unit in stages, and switches the first mode and the second mode according to the pressing force.

What is claimed is:

1. An image projection device comprising:
a projector configured to project an image;
a main body housing the projector;
an operation unit configured to receive an operation performed by an operator;
a wired input receiver configured to receive as input a video by wire; and
a wireless input receiver configured to receive as input a video by radio,
wherein the projector is in a projecting state while the operation unit is receiving a pressing operation performed by the operator,
wherein the projector is in a non-projecting state while the operation unit is not receiving a pressing operation performed by the operator,
wherein the controller controlling the operation of the projector sets a priority to each of the wired input receiver and the wireless input receiver, and in response to receiving as input a video signal into an input receiver having a higher priority, does not determine whether a video signal is input into an input receiver having a lower priority, and causes the projector to project the video signal input into the input receiver having the higher priority,
wherein the priority can be set by the operator of the image projection device,
wherein the main body housing the projector is provided with a button for the operator to perform an operation to set the priority,
wherein the projector is in the projecting state while the operator is pressing the operation unit,
wherein a priority setting screen for the operator to set the priority is displayed on the projection image output by the projector, and
wherein while the priority setting screen is open, projection is performed without a pressing operation on the operation unit.

2. The image projection device as claimed in claim 1, wherein the projector projects the image by emitting light to an outside, and
wherein the operation unit is installed so as to make an angle formed between a direction of a center of an optical axis of the light, and a pressing direction of the operation unit, not be equivalent to 90 degrees.

3. The image projection device as claimed in claim 1, wherein in response to a predetermined operation on the operation unit, switching is performed between
a first mode in which the projector is in the projecting state while the operation unit is receiving a pressing operation performed by the operator, and the projector is in the non-projecting state while the operation unit is not receiving a pressing operation performed by the operator; and
a second mode in which the projecting state of the projector is maintained while the operation unit is not receiving a pressing operation.

4. The image projection device as claimed in claim 1, wherein the projector includes an emitter, and the emitter is switched to be turned on and off in response to a pressing operation on the operation unit.

5. The image projection device as claimed in claim 1, wherein the projector includes an emitter and an image forming unit configured to form a projection image through light output from the emitter, and
wherein an operational state and a stop state of the image forming unit are switched in response to a pressing operation on the operation unit.

6. The image projection device as claimed in claim 1, further comprising:
a controller configured to control an operation of the projector; and
a switching unit configured to switch whether to supply power from the controller to the projector in response to a pressing operation on the operation unit.

7. The image projection device as claimed in claim 2, wherein the main body housing the projector is formed in a shape that can be held by one hand.

8. The image projection device as claimed in claim 7, wherein the main body is formed to have a dimension of the projector along an up-and-down direction of the projection image smaller than a dimension along a left-and-right direction of the projection image, and
wherein the operating unit is arranged in an upper part on a surface of the main body, corresponding to an upper side of the projection image.

9. The image projection device as claimed in claim 7, wherein the main body is formed to have a wide rectangular cross-sectional shape viewed in a projection direction of the projector.

10. The image projection device as claimed in claim 7, further comprising:
a convex part protruding from the main body in a projection direction of the projector,
wherein the projector is installed in the convex part.

11. The image projection device as claimed in claim 10, wherein the convex part is arranged to have its upper surface be flush with the upper surface of the main body.

12. The image projection device as claimed in claim 10, wherein the convex part is formed to have a wide rectangular cross-sectional shape viewed in the projection direction, formed to be smaller than a rectangular shape of the main body, and arranged to be closer to a center in a left-and-right width direction.

13. The image projection device as claimed in claim 1, further comprising:
    a detection unit configured to detect a state of the image projection device,
    wherein the controller controlling the operation of the projector controls a projection image output by the projector based on the state detected by the detection unit.

14. The image projection device as claimed in claim 1, wherein the setting operation of the priority is performed in response to operations performed in a specific sequence on the operation unit.

15. The image projection device as claimed in claim 1, wherein a module for wireless communication is stopped while operating with wired input.

16. The image projection device as described in claim 2, wherein the operation unit is installed to make an angle formed between a direction of a center of an optical axis of the projector, and the pressing direction of the operation unit, be an obtuse angle.

* * * * *